US011971706B2

(12) United States Patent
Fanidakis et al.

(10) Patent No.: US 11,971,706 B2
(45) Date of Patent: Apr. 30, 2024

(54) INDUSTRIAL PLANT MONITORING

(71) Applicant: BASF SE, Ludwigshafen (DE)

(72) Inventors: Nikolaos Fanidakis, Ludwigshafen (DE); Claus-Juergen Neumann, Ludwigshafen (DE); Benjamin Priese, Ludwigshafen (DE); Frank Strohmaier, Ludwigshafen (DE); Norman Volkert, Ludwigshafen (DE); Thomas Christ, Ludwigshafen (DE); Torsten Norbert Kneitz, Ludwigshafen (DE); Alexander Kubisch, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 17/796,698

(22) PCT Filed: Jan. 29, 2021

(86) PCT No.: PCT/EP2021/052193
§ 371 (c)(1),
(2) Date: Aug. 1, 2022

(87) PCT Pub. No.: WO2021/156157
PCT Pub. Date: Aug. 12, 2021

(65) Prior Publication Data
US 2023/0053545 A1 Feb. 23, 2023

(30) Foreign Application Priority Data
Feb. 4, 2020 (EP) .................................. 20155480

(51) Int. Cl.
*G05B 19/418* (2006.01)

(52) U.S. Cl.
CPC .............. *G05B 19/41875* (2013.01); *G05B 2219/37591* (2013.01)

(58) Field of Classification Search
CPC .... G05B 19/41875; G05B 2219/37591; G05B 23/0281; Y02P 90/80
See application file for complete search history.

(56) References Cited

U.S. PATENT DOCUMENTS

2014/0298098 A1* 10/2014 Poghosyan ......... G06F 11/3452
714/37

FOREIGN PATENT DOCUMENTS

EP 1914638 A1 4/2008

OTHER PUBLICATIONS

European Search Report for EP Patent Application No. 20155480.5, dated Jul. 15, 2020, 3 pages.

(Continued)

*Primary Examiner* — Manuel A Rivera Vargas
(74) *Attorney, Agent, or Firm* — Lowenstein Sandler LLP

(57) ABSTRACT

The present teachings relate to a method comprising a plurality of sensors, and one or more functionally connected processing units, the method comprising: providing, at any of the one or more processing units, time-series residual data of a sensor object; the sensor object being a group of at least some of the sensors from the plurality of sensors, and wherein the residual data comprises, for each of the sensors of the sensor object, a residue signal which is a difference between the sensor's measured output and the sensor's expected output, monitoring, via any of the one or more processing units, a level signal; wherein the level signal is indicative of a collective time-based variation of the time-series residual data, monitoring, via any of the one or more processing units, an association signal; wherein the association signal is indicative of the variation and/or association (Continued)

Figure 1:
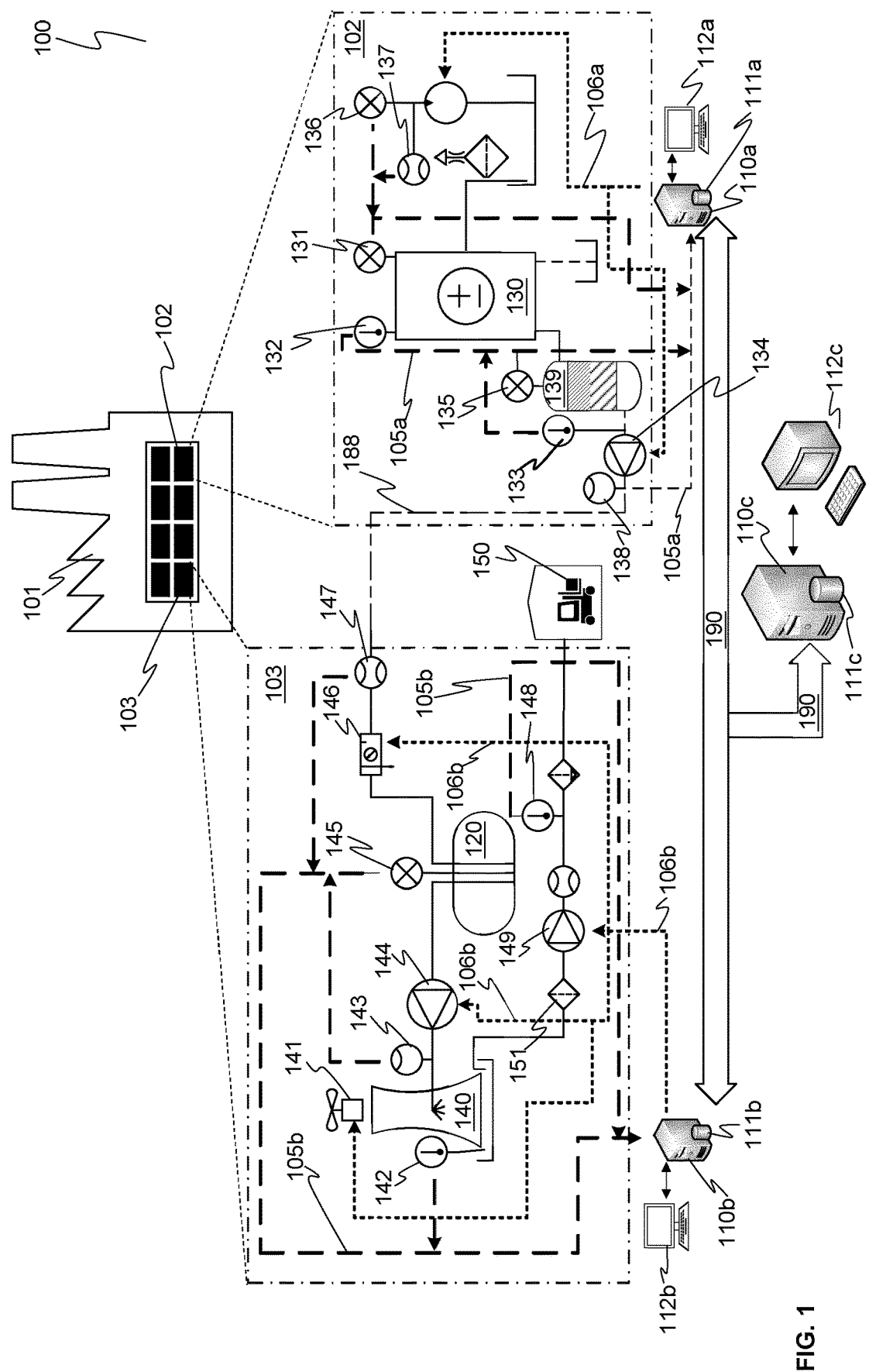

structure of the time-series residual data, generating, via any of the one or more processing units, an anomaly event signal when at a given time a value of the level signal and/or a value of the association signal changes from an expected value of the respective signal at or around that time. The present teachings also relate to a monitoring and/or control system for a plant comprising a plurality of sensors, wherein the system comprises one or more processing units configured to perform the method steps of any of the steps herein disclosed, and a computer software product.

14 Claims, 5 Drawing Sheets

(56) References Cited

OTHER PUBLICATIONS

International Application No. PCT/EP2021/052193, International Search Report and Written Opinion, dated Apr. 9, 2021.
MacGregor et al., Data-based latent variable methods for process analysis, monitoring and control., Computers & Chemical Engineering, 29(6):1217-23 (May 2005).
Wachs et al., Process monitoring using model-based PCA, IFAC Symposium on Dynamics and Control of Process Systems, Corfu, Greece, 31(11): 87-92 (1998).
Zhang et al., Application of model-based principal component analysis and golden batch to bioreactor monitoring and control, downloaded from the Internet at: <http://www.che.utexas.edu/twmcc/presentations0206/yzhang-poster0206.pdf> (Feb. 2006).

* cited by examiner

INDUSTRIAL PLANT MONITORING

CROSS-REFERENCE TO RELATED APPLICATIONS

This is the U.S. national phase of International Application No. PCT/EP2021/052193, filed Jan. 29, 2021, which claims the benefit of European Patent Application No. 20155480.5, filed Feb. 4, 2020.

TECHNICAL FIELD

The present teachings relate generally to computer-based monitoring of an industrial plant.

BACKGROUND ART

Industrial plants such as process plants comprise equipment that is operated to produce one or more industrial products. The equipment may, for example, be machinery and/or heat exchangers that require maintenance. A requirement for maintenance can depend on several factors that include operation time and/or load on the equipment, environmental conditions that the equipment has been exposed to, and so forth. Undue or unplanned shutdown of the equipment is generally not desired as it often results in a stoppage of production, which can reduce the efficiency of the plant and can cause wastage. Since the time-period between two maintenances can vary, it may be difficult to plan the shutdown of the equipment around the time when the maintenance is actually necessary. Accordingly, routine maintenance may either be done earlier than it actually is necessary, or the equipment operation may overrun the maintenance period. The latter can affect the life of the equipment, and/or cause operation with poor efficiency. As it will be appreciated, the latter can also increase the risk of an unplanned shutdown which can cause wastage of materials that could not be processed by the equipment due to the unplanned shutdown. Although the former approach can be used to reduce the risk of an unplanned shutdown, the approach may not always be desirable either, as it may result in more frequent maintenances, which can increase costs.

Plants also comprise a plurality of sensors for measuring or detecting one or more parameters related to the equipment. Some sensors may also require maintenance themselves, for example, preventive maintenance and/or calibration to ensure their reliability in measurement and/or detection of the parameters that they are supposed to measure or detect.

In many cases, an output change of a sensor can also indicate the health of the equipment that the sensor is measuring. It is, however, also possible that the output change has been caused by an ill functioning of the sensor itself, and not by reduced health of the equipment. Plants can often comprise several hundreds or thousands of sensors. Large industrial plants can comprise several tens of thousands of sensors, or even more. It can thus be challenging to obtain an indication of the equipment health by monitoring each sensor. Moreover, it can be challenging to determine to state of the equipment even if a sensor output drifts. As a result, false positive events may be triggered. Frequent false event signals or alarms may reduce the usability of such a system.

There is thus a requirement for a method for monitoring a plant that utilizes the sensor outputs more efficiently for detecting an anomaly in the plant.

SUMMARY

At least some of the problems inherent to the prior-art will be shown solved by the subject-matter of the accompanying independent claims.

When viewed from a first perspective there can be provided a method for monitoring a plant comprising a plurality of sensors, and one or more functionally connected processing units, the method comprising:

providing, at any of the one or more processing units, time-series residual data of a sensor object; the sensor object being a group of at least some of the sensors from the plurality of sensors, and wherein the residual data comprises, for each of the sensors of the sensor object, a residue signal which is a difference between the sensor's measured output and the sensor's expected output, monitoring, via any of the one or more processing units, a level signal; wherein the level signal is indicative of a collective time-based variation of the time-series residual data, monitoring, via any of the one or more processing units, an association signal; wherein the association signal is indicative of the variation and/or association structure of the time-series residual data, generating, via any of the one or more processing units, an anomaly event signal when at a given time a value of the level signal and/or a value of the association signal changes from an expected value of the respective signal at or around that time.

The last step can also alternatively be expressed as, generating, via any of the one or more processing units, a level event signal and/or an association event signal; wherein the level event signal is generated when at a given time a value of the level signal changes from an expected value of the level signal at or around that time, and the association event signal is generated when at a given time a value of the association signal changes from an expected value of the association signal at or around that time.

An occurrence of the level event signal and/or an association event signal may be considered by the processing unit as the anomaly event. In other words, the level event signal and/or an association event, or more generally the anomaly event signal, is indicative of an anomaly in at least one of the equipment in the plant. Any one or both of the values may also be time-dependent values.

Those skilled in the art will appreciate that the term "time-dependent" in this disclosure refers to such values or parameters that can vary with time. Such values may not have a direct dependence on time, rather that due to time-varying nature of the signals and process parameters related to the plant which are time-series data, such values can be represented or computed as a series of discrete or continuous values along a time scale, or time-series values. Accordingly, it will also be appreciated that is not a must that such values always or regularly have to change with the progression of time.

In some cases, the last step may even be:

generating, via any of the one or more processing units, an anomaly event signal when at a given time a magnitude of the residue signal exceeds beyond a residue threshold, and a value of the level signal and/or the association signal changes from an expected value of the respective signal at or around that time.

In some cases, it is also possible that the residual data may be provided at the one or more functionally connected processing units as input data. In such cases, the first step may be specifically:

receiving, at any of the one or more processing units, time-series residual data of a sensor object; the sensor object being a group of at least some of the sensors from the plurality of sensors, and wherein the residual data comprises, for each of the sensors of the sensor object, a residual signal which is a difference between the sensor's measured output and the sensor's expected output.

The residual data may be received directly at one or more inputs of the one or more processing units. Alternatively, the residual data may be received at a computer memory functionally connected to any of the one or more processing units.

In some cases, the residual data may even be generated by the one or more functionally connected processing units. In such cases, the first step may be specifically:

generating, at any of the one or more processing units, time-series residual data of a sensor object; the sensor object being a group of at least some of the sensors from the plurality of sensors, and wherein the residual data comprises, for each of the sensors of the sensor object, a residual signal which is a difference between the sensor's measured output and the sensor's expected output;

In some cases, the residual data may even be monitored, as it will be explained later. In such cases, the method also comprises:

monitoring, via any of the one or more processing units, the time-series residual data of a sensor object.

Monitoring of the residual data may be done by monitoring each residual signal, i.e., for each sensor or any one or more of the residual signals. Accordingly, for any sensor of which the residual signal magnitude exceeds a predetermined value or threshold at any given time, a residual event may be recorded for that time in a memory location functionally connected to any of the one or more processing units. No action, e.g., raising an alarm or recording an anomaly, is performed if the level signal and the association signal are as expected. Whereas, if the level event signal and/or the association event signal has occurred at or around a given time that the residual event(s) from one or more sensors occurred. In such cases, the residual event signal(s) from one or more sensors may be analyzed to find the source or root cause of the anomaly. By saying at or around a given time, it is meant that to be considered for analysis, the residual event signal may have occurred either at the same time, or earlier, or after the occurrence of the level event signal and/or the association event signal. It will be appreciated that rather than measuring the residual magnitude, the monitoring of the sensor signal(s) may even be based on the measured signal magnitude of any sensor exceeding beyond a given threshold from the expected value of that sensor. Both the cases are hence considered equivalent and may be used interchangeably in this disclosure, for example with reference to thresholds.

"Sensor object" may refer to a specific group of at least some of the sensors from the plurality of sensors of the plant. In other words, the sensor object is a group of sensors signals of which residual signals are collectively monitored in the form of the level signal and/or the association signal. In large scale production plants such as chemical and/or biological plants, the number of sensors that are to be monitored are large. Typically, the number of sensors in a chemical or biological plant can be well above 1000, often there can be several tens of thousands of sensors, or in some cases hundreds of thousands of sensors or even more. In chemical and/or biological plants with complex production and value chains such a plurality of industrial plants or a Verbund arrangements, the number of sensors can be huge.

The proposed sensor object allows applying the multivariate techniques disclosed herein more effectively. The applicant has realized that if the multivariate techniques are realized to a group that includes all sensors of the plant or a sub-optimal group of sensors, such a group can lack sensitivity with respect to the anomalies to be detected. Smaller but important deviations in some of the sensors can be overcontrolled or dominated by larger but less important deviations in other sensors in the group. The present teachings also allow defining suitable groups of sensors in the form of one or more sensor objects, each of which can allow maintaining sensitivity for anomalies without being overcome by other sensor signals.

Compared to univariate methods, multivariate monitoring methods can have an advantage of reducing false-positive rate in generating alerts that point to an anomaly within the sensor object. Hence, the sensor object as herein disclosed can allow maintaining low false positives while achieving high sensitivity for anomaly detection.

Clustering of at some of the sensors from the plurality of sensors into one or more sensor objects can be done in many ways as discussed above. However, sub-optimal clustering or grouping of sensors in a sensor object can affect sensitivity of detection. Moreover, manual clustering to generate a sensor object can take a long time without a guarantee of success. Even when an expert can be obtained, grouping the sensors manually via manual input can lead to huge manual workload even if it is to be performed in large scale. Since each plant may be unique in itself, it can be hard to perform a proper grouping as there can be a number of unknowns involved. Moreover, often the information on plant topology is not provided in a processable data format, e.g. mathematical model of a plant that can be processed or evaluated—at least not to the required degree of detail.

According to a preferred aspect, the sensor object is provided by at least partially automatically selecting the at least some of the sensors from the plurality of sensors. Said selection is made based on the suitability of the at least some of the sensors to be grouped within the sensor object.

According to an aspect, similarity detection using a data-centric algorithm is used for building the sensor object. Preferably, the selection is done fully automatically. As discussed, more specifically, the selecting of the at least some of the sensors, or grouping of the sensors, is performed by one or more data-centric methods or algorithms. Preferably, the data-centric algorithm is configured to use at least one similarity measure for grouping sensors from the plurality sensors into sensor objects. For example, the data-centric algorithm uses at least one similarity measure to group the at least some of the sensors for providing the sensor object. Here, by data-centric algorithm it is meant an algorithm that is configured to leverage sensor data, such as historical time-series data of the plurality of sensors, for at least partially automatically grouping or selecting the at least some of the sensors. Further specifically the data-based algorithm may be one or more clustering algorithms. The clustering algorithm may be an unsupervised learning algorithm such as a neural network model trained via unsupervised learning using the historical data of the plurality of sensors, or any other suitable algorithm for clustering and dimension reduction. The unsupervised learning algorithm may, for example, be self-organizing maps ("SOM"). The applicant has found SOM to be particularly beneficial for automatically grouping appropriate sensors into sensor objects.

Thus, according to an aspect, using one or more self-organizing maps, any one or more of the processing units is configured to arrange or order, at a computer memory, the sensors according to similar patterns, or one or more similarity measures, in their time-dependent signals. For this purpose, historical time-series data from the corresponding sensors can be leveraged. The sensors may be arranged on a matrix or a computer-readable 2D map space. In a following step, this matrix or map is subdivided or fragmented for generating one or more sensor objects. For example, the map space may be fragmented or cut using a symmetrical or asymmetrical grid. Additionally, or alternatively, the map space is cut using a distance value around a cluster of sensors on the map. For example, a cluster may be detected automatically via a similarity measure that involves selecting the sensors that lie within a certain distance from each other. Then all sensors that lie within a distance value may be grouped in a sensor object. The distance value measure may even comprise multiple distance values, for example for capturing sensors that form an asymmetrical cluster. Sometimes, sub-clusters within a cluster may be detected based on one or more distances for better capturing asymmetric clusters. In some cases, the entire plurality of sensors is divided as explained into sensor objects. The sensor object may have two or more sensors. In a preferred aspect, the sensor object may have 20 or few sensors, but not below 2 sensors. The population of the sensors within the sensor objects may differ, e.g., some sensor objects may have more than 20 sensors, for example around 100 sensors. According to a preferred aspect, the sensor object comprises signals from 20 or around 20 sensors. According to a more general preferred aspect, the sensor object comprises signals from 10, around 10, or several tens of sensors. The term "several tens of sensors" here is meant to include any integer number of sensors equal to or less than 100, for example, 4, or 12, or 25, or 30 sensors. Proposed automatic clustering allows capturing the sensors that are suitable to be included within a sensor object, e.g., by allowing automatic detection of similarity between the sensors. Thus, the anomaly detection can be performed without an expert user and with little or no specifics of the sensors or the plant topology. For complex and large plants such as chemical and biological plant this can be a significant advantage.

According to an aspect, the SOM is trained using unsupervised learning using sensor data from the plurality of sensors to produce a two-dimensional, discretized representation of the input vectors, which in this case would be the sensor data that needs to be clustered into sensor objects, i.e., data from the plurality of sensors. Pursuant to the present teachings, those of the input vectors, or sensor signals, that are similar in high dimensional space are mapped to nearby nodes in a two-dimensional ("2D") space. The similarity may be measured in terms of distance between the sensor nodes mapped in the 2D space.

As a non-limiting example of automatic grouping using SOM, the 2D space may be defined or specified for example, beforehand by representing its geometry as a k*n grid. The sensor nodes may be mapped into the 2D space, initially at random, and then their position is iteratively adjusted. In this way, neighboring points in the initial geometry of the input vectors can be mapped to nearby points in the 2D space.

Pursuant to the present teachings, by selecting a distance/similarity measure that is appropriate for sensor time-series data, one or more SOMs can be used to cluster times-series into groups with matching shapes. Those skilled in the art shall appreciate that said groups represent sensor objects.

It will be appreciated that the processing units need not be located at the same site or at the same physical location. For example, at least some of the processing units may be implemented as, or at, a cloud service. Since each of the processing functions of monitoring the level signal and the association signal provide at least one technical advantage, such functions are patentable also in their own right.

Accordingly, when viewed from another perspective, there can also be provided a method for monitoring a plant comprising a plurality of sensors, and one or more functionally connected processing units, the method comprising:

providing, at any of the one or more processing units, time-series residual data of a sensor object; the sensor object being a group of at least some of the sensors from the plurality of sensors, and wherein the residual data comprises, for each of the sensors of the sensor object, a residual signal which is a difference between the sensor's measured output and the sensor's expected output, monitoring, via any of the one or more processing units, a level signal; wherein the level signal is indicative of a collective time-based variation of the time-series residual data, generating, via any of the one or more processing units, a level event signal; wherein the level event signal is generated when at a given time a value of the level signal changes from an expected value of the level signal at or around that time, wherein the level event signal is indicative of an anomaly in at least one of the equipment in the plant.

Similarly, when viewed from yet another perspective, there can also be provided a method for monitoring a plant comprising a plurality of sensors, and one or more functionally connected processing units, the method comprising:

providing, at any of the one or more processing units, time-series residual data of a sensor object; the sensor object being a group of at least some of the sensors from the plurality of sensors, and wherein the residual data comprises, for each of the sensors of the sensor object, a residual signal which is a difference between the sensor's measured output and the sensor's expected output, monitoring, via any of the one or more processing units, an association signal; wherein the association signal is indicative of the variation and/or association structure of the time-series residual data, generating, via any of the one or more processing units, an association event signal; wherein the association event signal is generated when at a given time a value of the level signal changes from an expected value of the association signal at or around that time, wherein the association event signal is indicative of an anomaly in at least one of the equipment in the plant.

As it was discussed, previously, preferably the sensor object is provided by at least partially automatically grouping the at least some of the sensors.

As it will be appreciated, for any of the above cases, rather than generating an event indicating an anomaly based on the residual signal, i.e., when the measured signal of a sensor exceeds beyond a given threshold from the expected value of the sensor signal, the present teachings defer the anomaly event signal generation based on the monitoring of the level signal and/or the association signal. The anomaly event is generated when either one or both of the level signal and the association signal change from their respective expected value. Accordingly, in other words, the generation of the anomaly event signal is prevented when any of the residual signal exceeds beyond their residue threshold while both the level signal and the association signal are within their respective expected values, anomaly event is thus based on the result of level signal and/or association signal monitoring.

According to an aspect, the respective expected values of the level signal and the association signal are each preferably provided as a respective range of values within which these respective signals may validly lie. Each of the level signal and the association signal may thus be provided at least one limit value at any given time. If the signal value is within the respective limit at that time, the value is considered as expected and anomaly event is not generated. On other words, any of the respective expected value may be provided as a corresponding expected value limit, specifying for a given time a plurality of expected values that the corresponding signal may validly have without the anomaly event being generated. The limit values may also be time-dependent values. It will be appreciated that the plurality of expected values may either be discrete values, or they may correspond to any value the respective signal can take within the range specified by the corresponding limit value.

The applicant has found that the proposed event generation based on the monitoring of the level and association signals can result in significant reduction of false positive events whilst preserving focus on detecting a real anomaly.

In response to the anomaly event signal, an alarm may be generated to inform an operator or user about an anomaly in an equipment that the sensor object is related to. Alternatively, or in addition, any of the one or more processing units, henceforth simply termed as the processing unit, may backtrack the sensor data to determine the source of the anomaly. Hence, according to an aspect, the method also comprises:

determining, in response to the anomaly event signal, health of an equipment related to the sensor object.

The health of the equipment may be determined, for example, by performing a root cause analysis via the processing unit.

As outlined earlier, in some cases, the change or deviation from the expected value, is provided with a limit value. If the signal value lies within its associated limit value, no event signal is generated. Accordingly, when any of the monitored signals, level or association, of the sensor object deviates beyond a given limit, or control range, this deviation can be considered as an anomaly and an alert may be generated in the form of the event signal, (e.g., the level event signal, the association event signal, or both). As proposed, the state of the sensor object is monitored or observed using the level signal and/or the association signal, both being time-dependent or time-based signals. It will be appreciated that the given limits can be defined as per the application of interest, for example, the acceptable tolerance of deviation, required sensitivity of events, criticality or importance of the sensor object, and similar. According to an aspect, the limit values are derived using statistical limits within which the respective signals, level and association signals, are expected to lie under normal conditions. The limit value thus represents a value range or probability space for the movement of, or around, the expected value within which the monitored signal value can be validly located. In some cases, there may even be an upper limit value and a lower limit value especially for the association signal. The probability space which lies within the upper limit value and the lower limit value may thus be defined by a plurality of expected values. In either of the cases, the probability space can be determined using historical data, e.g., from past monitoring. The limit values may thus be understood as defining a value range within which range the observed value may be allowably located with a given probability value. A limit value can, as per application requirements, and/or availability of the historical sensor data, either be zero or a non-zero value. The limit value may also be a time-dependent value. Accordingly, it is not essential to attach a specific number to the limit values in this disclosure.

For monitoring the validity of the sensor data related to the sensor object, the applicant has found that the two indicators discussed above, i.e., the level signal and the association signal, can be particularly effective in condensing the multivariate information from the sensor data into individual or consolidated scores. The indicators are applied to the residual signals of the sensor object. Residual signal, which is generated for each sensor of the sensor object, is a difference between the measured sensor output signal (or observed sensor signal) at a given time and an expected sensor signal at that time. The indicators are then generated from the residual data which comprises the residual signals from the sensor object sensors. The applicant has realized that the measured sensor output signal in most cases comprises a plurality of information, most of which can be irrelevant for detecting an anomaly, or equipment health. For example, the measured or observed sensor output signal can depend upon controller settings, production mode, operating conditions of the plant and or equipment, etc. The information related to the equipment health can thus drown within superfluous information caused by the various other parameters that the sensor output is dependent upon. The applicant has realized that rather than using sensor output signals directly, by applying the proposed indicators on the residual data instead, the superfluous information can at least partially be removed, from the time dependent sensor outputs, such that the health-related information of the equipment can become more detectable for further signal processing.

The first indicator, the level signal, provides information or a statistical value related to the collective movement of the time dependent residual signals in the time-series residual data of the sensor object. The level signal value can be used to detect level changes or short-term trends of the time-series residual data within the sensor object. The second indicator, the association signal, provides information or a statistical value related to the variation and/or association structure of the time-series residual data. The association signal is indicative of changes in volatility and/or correlation structure among the time-series residual signals within the sensor object.

The event signal for the respective signal, the level signal and/or the association signal, can be generated when the magnitude of the signal value goes beyond an expected value or a given limit of the expected values of that signal at that time. The indicators are thus compared at any given time with respect to, what can be called an expected state thereof for that time. The expected state or time dependent expected signal values can be provided by a model of the sensor object. The sensor object model can be a predictive model, such as at least partially a data-driven model, e.g., comprising a sensor object neural network, that has been trained using historical residual data. The results of the comparison, i.e., a deviation of the level signal from its expected state, and a deviation of the association signal from its expected state, are monitored via the processing unit over time. The anomaly event signal is generated when the magnitude of the level signal value and/or the association signal value diverges, beyond a limit, from the expected value of that signal at that time. The deviations are monitored via the processing unit over time.

Monitoring of the signals or even the deviations can either be done continuously or it can be done between discrete time periods, of either equal or unequal lengths.

The sensor object can be provided at the processing unit, for example, via a memory functionally connected to the processing unit. According to an aspect, generation of the residual data is done via the same processing unit. Alternatively, the generation of the residual data can be done by another processor and then provided at the processing unit.

Industrial plants, or simply plants, comprise infrastructure that is used for an industrial purpose. The industrial purpose may be manufacturing or processing of one or more products, i.e., a manufacturing process or a processing performed by the plant. The product can, for example, be any physical product, such as a: chemical, biological, pharmaceutical, food, beverage, textile, metal, plastic, semiconductor, or the product can even be a service product such as: electricity, heating, air-conditioning, waste treatment such as recycling, chemical treatment such as breakdown or dissolution, or even incineration, etc. Accordingly, the plant can be any or more of the: chemical plant, pharmaceutical plant, fossil fuel processing facility such as oil and/or natural gas well, refinery, petrochemical plant, cracking plant, and such. The plant can even be any of the: distillery, incinerator, or power plant. The plant can even be a combination of any of the above, for example, the plant may be a chemical plant that includes a cracking facility such as a steam cracker, and/or a power plant. For applying the present teachings, in some cases a subfacility within a large plant may even be considered a plant. The infrastructure can comprise equipment or process units such as any one or more of: heat exchanger, column such as fractionating column, furnace, reaction chamber, cracking unit, storage tank, precipitator, pipeline, stack, filter, valve, actuator, transformer, circuit breaker, machinery e.g., heavy duty rotating equipment such as turbine, generator, pulverizer, compressor, fan, pump, motor, etc.

The plant or industrial plant may even be part of a plurality of industrial plants. The term "plurality of industrial plants" as used herein is a broad term and is to be given its ordinary and customary meaning to a person of ordinary skill in the art and is not to be limited to a special or customized meaning. The term specifically may refer, without limitation, to a compound of at least two industrial plants having at least one common industrial purpose. Specifically, the plurality of industrial plants may comprise at least two, at least five, at least ten or even more industrial plants being physically and/or chemically coupled. The plurality of industrial plants may be coupled such that the industrial plants forming the plurality of industrial plants may share one or more of their value chains, educts and/or products. The plurality of industrial plants may also be referred to as a compound, a compound site, a Verbund or a Verbund site. Further, the value chain production of the plurality of industrial plants via various intermediate products to an end product may be decentralized in various locations, such as in various industrial plants, or integrated in the Verbund site or a chemical park. Such Verbund sites or chemical parks may be or may comprise one or more industrial plants, where products manufactured in the at least one industrial plant can serve as a feedstock for another industrial plant.

Those skilled in the art will appreciate that the plant usually also comprises instrumentation that can include several different types of sensors. Sensors are used for measuring various process parameters and for measuring parameters related to the equipment. For example, sensors may be used for measuring process parameters such as flowrate within a pipeline, level inside a tank, temperature of a furnace, chemical composition of a gas, etc., and some sensors can be used for measuring vibration of a turbine, speed of a fan, opening of a valve, corrosion of a pipeline, voltage across a transformer, etc. The difference between these sensors can not only be based on the parameter that they sense, but it may even be the sensing principle that the respective sensor uses. Some examples of sensors based on the parameter that they sense are: temperature sensors, pressure sensors, radiation sensors such as light sensors, flow sensors, vibration sensors, displacement sensors and chemical sensors, such as those for detecting a specific matter such as a gas. Examples of sensors that differ in terms of the sensing principle that they employ are for example: piezoelectric sensors, piezoresistive sensors, thermocouples, impedance sensors such as capacitive sensors and resistive sensors, and so forth. The exact parameter measured by a sensor or the principle employed thereof is not of importance to the scope of generality of the present teachings.

The plant is thus often equipped with sensors that measure the value of a certain quantity in the plant (e.g., temperature in a column, pressure in a pipe, mass flow, etc.) either continuously or at regular intervals. Each of these values is usually saved with additional information into a plant information system ("PIMS"). The additional information may be one or more of the metadata such as: sensor name, timestamp of measurement, value of measurement, unit, quality of measurement.

In a plant, at least some of the sensor outputs are received directly or indirectly at a control system that controls at least some of the operations of the plant. Some plants may even comprise multiple control systems that may be configured to operate in a hierarchy, or in parallel. Exact architecture of the one or more control systems, Industrial Control Systems ("ICS"), is not essential for the scope of generality of the present teachings. It is also usual for plants to have a data acquisition system ("DAS") that receives data from a plurality of sensors within the plant. The sensor data is stored in a long-term computer memory or a database. DAS may be the same system as PIMS or they may be different systems. The sensor data usually includes metadata indicating the history or time information of the data collected from the sensors. The historical sensor data is hence usually stored in, or is recoverable from, the database as a time-series data. Historical association and/or level signal data may also be stored in the same database or another database functionally connected to the processing unit. As mentioned above, the metadata can also include unit and/or label of the sensor time-series data. A sensor is often also termed a tag or a sensor tag in industrial plants. Some more examples of plant control and/or monitoring systems are: Programmable Logic Controller ("PLC"), Distributed Control System ("DCS"), and Supervisory Control and Data Acquisition ("SCADA"). Furthermore, in some plants the function of any two or more of the systems mentioned above may be performed by a single control and/or monitoring system. Most control systems and monitoring systems nowadays are digital systems, i.e., operating on digital signals, accordingly the sensor data received by such systems is also converted to a digital signal either by the sensor itself, or at any stage before the analog signal is processed by the digital processor of the system. The teachings thus apply to any kind of plant monitoring and/or control system that comprises one or more processing units. Some sensor outputs may depend upon the control system states, for example, via the process parameters that are directly or indirectly influenced by the control system or controller. By way of monitoring the residuals by consolidating them in the level and association signals, such influences can be at least partially removed such that detection of an anomaly can be improved whilst reducing false positive detections.

The applicant has realized that by the proposed method or the system for monitoring thereof, it can be made possible to detect an onset of an anomaly or unusual behavior in the plant at an early stage before the problem becomes observable by an operator or a conventional monitoring system. It can thus be prevented that at least some of the plant equipment unexpectedly shuts down due to an anomaly that manifested itself over time. Such prevention can be made by detecting the anomaly using the present teachings and planning a maintenance such that disruption of the industrial process can be at least reduced. It can also be provided to guide the operator's attention to a specific plant area or equipment where the problem may later manifest itself such that a remedial action may be planned.

According to an aspect, in response to the occurrence of the anomaly event signal, the processing unit determines a state of health of at least one piece of equipment in the plant. According to further an aspect, in response to the anomaly event signal, the processing unit initiates further analysis involving analyzing historical and/or real-time time-series data of at least one individual sensor or a sub-group of sensors within the plurality of sensors. According to an aspect, the processing unit prioritizes the further analysis of one or more sensors outputs for which the residue signal exceeded beyond their respective residue threshold, or the at least one sensor which have each an associated residue event signal that occurred around the same time as the occurrence of the anomaly signal.

Either directly in response to the anomaly event signal or by subsequently analyzing data related to the one or more of the sensors, the processing unit can determine more specifically which piece of equipment or sensor may require maintenance. More preferably, by analyzing said time-series signals over a given time-period, the processing unit may forecast the maintenance schedule of the at least one piece of equipment. As it will be appreciated, by doing so the processing unit may provide the future maintenance requirements related to the equipment and/or one or more sensors. In addition, the amount of sensor data that the processing unit is required to monitor and analyze in real-time can be reduced by monitoring the proposed level and association signals. Especially under normal operation of the equipment, or when no detectable anomaly is existing, the resources used for monitoring can be significantly reduced as compared to the case when each sensor signal is individually analyzed. As mentioned previously, this can also have additional advantages when it comes to false detections as compared to a univariate approach, i.e., monitoring and analyzing each sensor individually.

According to an aspect, in response to the level event signal, the processing unit analyzes time series residual signal of each sensor within the sensor object to determine one or more main drivers or most dominant contributors to the level signal value. The determination may be done, for example, using an effect size calculation and/or value distribution analysis. Effect size is a measure of distance of how far a residual signal is from a specific residual value within a given time-period. The specific residual value is usually the most probable value of that residual signal within the given time-period.

According to an aspect, in response to the association event signal, the processing unit analyzes time series residual signal of each sensor within the sensor object to determine one or more main drivers or most dominant contributors to the association signal value. In a further aspect, the processing unit analyzes covariance of time series residual signals of each pair combination of sensor residual signals within the sensor object to determine one or more main drivers or most dominant contributors to the association signal value.

The proposed teachings can leverage the similarity and/or association between the residual data from the sensors within the sensor object to focus computational monitoring effort on the scenarios in which data from one or more sensors deviates in such a way that it has a bearing on the overall level and association of the residual data within the sensor object. The grouping of sensor residual data allows monitoring according to the proposed multivariate approach. It will be appreciated that this can free up computational resources while retaining focus on the overall behavior of the relevant sensor data comprised within the sensor object.

As it was discussed, according to an aspect the grouping is at least partially done automatically via the processing unit, for example, using self-organizing maps. The automatic grouping may be done by the processing unit based on data characteristics, for example, similarity of the sensor time-series data of the sensor object and/or based on the interdependency between the output signals of the sensors, and/or type of sensor, and/or similarly in sensor response. In addition, or alternatively, according to an aspect the grouping is done based on an input from a user. Accordingly, the grouping may be done at least partially based on operator preference or experience. In either case, automatic or user guided, the proposed multivariate approach using the level signal and the association has an advantage that interdependencies among the residuals may be used to detect behavior that may otherwise be undetectable on individual signal level. As discussed previously, false-detections can be reduced as compared to a univariate monitoring approach, i.e., monitoring data from each sensor individually, whilst retaining sensitivity of detection of anomalies within the sensor object.

Thus, when viewing from another perspective, there can also be provided a method for monitoring a plant comprising a plurality of sensors, and one or more functionally connected processing units, the method comprising:

providing, at any of the one or more processing units, time-series residual data of a sensor object; the sensor object being a group of at least some of the sensors from the plurality of sensors, and wherein the residual data comprises, for each of the sensors of the sensor object, a residue signal which is a difference between the sensor's measured output and the sensor's expected output, wherein the sensor object is provided by at least partially automatically grouping the at least some of the sensors, monitoring, via any of the one or more processing units, a level signal; wherein the level signal is indicative of a collective time-based variation of the time-series residual data, monitoring, via any of the one or more processing units, an association signal; wherein the association signal is indicative of the variation and/or association structure of the time-series residual data, generating, via any of the one or more processing units, an anomaly event signal when at a given time a value of the level signal and/or a value of the association signal changes from an expected value of the respective signal at or around that time.

As it was discussed, the automatically grouping is performed using at least one data-centric algorithm. The data-centric algorithm may be a clustering algorithm, for example SOM algorithm.

According to an aspect, a fully automatic grouping is initially performed, and then a part of the grouping is rearranged as per user input. This can be helpful in onboarding a new plant, and manual intervention can be reduced.

According to an aspect, a first group of sensor outputs, from a first group of sensors within the plurality of sensors, are configured or tagged as covariate signals. Further, a second group of sensor outputs, different from the first group of sensor outputs, are configured or tagged as monitored signals. The sensor object is realized using the residuals from the second group of sensor outputs. The first group of outputs, or the covariate signals, are the signals that represent parameters that can cause a change in the behavior of at least one of the monitored signals. The covariate signals hence represent influential factors or parameters that preferably can influence the monitored signals. The covariate signals may represent parameters such as, ambient temperature, coolant temperature, load, input flow, output flow, controlled measurement or setscrew position. One or more or the monitored signals are hence preferably at least partially dependent upon at least one of the covariate signals. The processing unit may automatically determine the covariate signals from the monitored signals by checking the interdependencies between the sensor outputs. Alternatively, at least some of the covariates and/or monitored signals may be defined based on user input. The advantage of consolidated monitoring of sensor data can still be maintained.

According to an aspect, data from the first group of outputs or covariate signals is also input to the sensor object model for generating an expected level signal and an expected association signal and/or the respective limits thereof. Thus, time dependent values of the level signal and the association signal are compared with the time dependent values of the expected level signal and the expected association signal. The applicant has thus realized that the expected values and their limits can be made more accurate by considering the covariates, which can synergistically improve the detection of an anomaly at an early stage while automatically accounting for the factors that can influence the sensor data. The expected values can thus also be adapted according to covariate signals. This when combined with the monitoring being done at sensor object level can also result in a solution that required reduced monitoring resources and reduced false positives. Reliability of detection can hence be improved.

According to yet another aspect, the sensor's expected output is provided by an expected state model, a Machine Learning ("ML") model. The expected state model is a prediction model, e.g., at least partially a data-driven model, such as an expected state neural network, that is trained using training data that comprises historical time series output data of the sensor.

Thus, the expected state model may be, or it may comprise as a machine learning ("ML") module, a prediction model that when trained using training data that comprises historical time series output data of the sensor results in a trained data driven model. "Data driven model" refers to a model that is at least partially derived from data, in this case from the user training data that may comprise historical data related to the sensor. In contrast to a rigorous model that is purely derived using physio-chemical laws, a data driven model can allow describing relations that cannot be modelled by physio-chemical laws. The use of data driven models can allow to describe relations without solving equations from physio-chemical laws, e.g., related to the processes taking place within the respective production process. This can reduce computational power and/or improve speed.

The data driven model may be a regression model. The data driven model may be a mathematical model. The mathematical model may describe the relation between provided performance properties and determined performance properties as a function.

Thus, in the present context, the data-driven model, preferably data-driven machine learning ("ML") model or a merely data-driven model, refers to a trained mathematical model that is parametrized according to the respective training data set, such as historical time series output data of the sensor, to reflect reaction kinetics or physio-chemical processes related to the plant and/or one or more equipment. An untrained mathematical model refers to a model that does not reflect reaction kinetics or physio-chemical processes, e.g. the untrained mathematical model is not derived from physical law providing a scientific generalization based upon empirical observation. Hence, the kinetic or physio-chemical properties may not be inherent to the untrained mathematical model. The untrained model does not reflect such properties. Feature engineering and training with the respective training data sets enable parametrization of the untrained mathematical model. The result of such training is a merely data-driven model, preferably data-driven ML model, which as a result of the training process, preferably solely as a result of the training process, reflects reaction kinetics or physio-chemical processes related to the respective plant and/or one or more of the plant's equipment or assets.

The expected state model may even be a hybrid model. A hybrid model may refer to a model that comprises first-principles parts, so called white box, as well as data-driven parts as explained previously, so called black box. The expected state model may comprise a combination of a white-box-model and a black-box-model and/or a grey-box-model. The white-box-model may be based on physio-chemical laws, for example expressed as equations. The physiochemical laws may be derived from first principles. The physio-chemical laws may comprise one or more of chemical kinetics, conservation laws of mass, momentum and energy, particle population in arbitrary dimension. The white-box-model may be selected according to the physio-chemical laws that govern the respective plant, its production process or parts thereof. The black-box-model may be based on historical data, such as the historical time series output data of the sensor. The black-box-model may be built by using one or more of machine learning, deep learning, neural networks, or other form of artificial intelligence. The black-box-model may be any model that yields a good fit between the training data set and test data. The grey-box-model is a model that combines a partial theoretical structure with data to complete the model.

The trained model may comprise a serial or parallel architecture. In the serial architecture output of the white-box-model may be used as input for the black-box-model or output of the black-box-model may be used as input for the white-box-model. In the parallel architecture a combined output of the white-box-model and the black-box-model may be determined such as by superposition of the outputs. As a non-limiting example, a first sub-model may predict at least one of the performance parameters and/or at least some of the control settings based on a hybrid model with an analytical white-box-model and a data-driven model that serves as a black-box corrector trained on the respective historical data. This first sub-model may have a serial architecture, wherein the output of the white-box-model is input for the black-box-model, or the first sub-model may have parallel architecture. Predicted output of the white-box model may be compared with a test data set comprising a part of historical data. An error between the computed white-box output and test data can be learned by the data-driven model and can then applied for arbitrary predictions. The second sub-model may have a parallel architecture. Other examples can be possible, too.

As used herein, the term "machine learning" or "ML" may refer to a statistical method that enables machines to "learn" tasks from data without explicitly programming. Machine learning techniques may comprise "traditional machine learning"—the workflow in which one manually selects features and then trains the model. Examples of traditional machine learning techniques may include decision trees, support vector machines, and ensemble methods. In some examples, the data driven model may comprises a data driven deep learning model. Deep learning is a subset of machine learning modeled loosely on the neural pathways of the human brain. Deep refers to the multiple layers between the input and output layers. In deep learning, the algorithm automatically learns what features are useful. Examples of deep learning techniques may include convolutional neural networks ("CNNs"), recurrent neural networks such as long short-term memory ("LSTM"), and deep Q networks.

Alternatively, or in addition, similar to the above, the sensor object model may be, or it may comprise as a sensor object machine learning ("ML") module, a prediction model that when trained training data that comprises historical time-series data results in a trained sensor object data driven model.

The expected output of the sensor is thus generated by inputting data from the first group of outputs or at least one of the covariate signals to the expected state model. It will be appreciated that each sensor or tag may be provided with a respective expected state model that has been trained using the historical data from that specific sensor. The covariate signals input to the expected state model can either be all the covariate signals of the plant, or they may be a subset of the plant covariate signals. The plant can be viewed as a closed system with expected as well as unexpected interdependencies between different equipment. For example, external temperature of an operative furnace may result in that the local ambient temperature is higher than other parts of the plant. This may thus raise the temperature of a pipe close to the furnace, which in turn alters the density of the liquid flowing through that section of the pipe that is close to the furnace. Such interdependencies may manifest in different ways in the plant operation parameters. In a strict sense, in order to have a complete picture of the interdependencies, all covariate inputs may be required to the expected state model and/or sensor object model. However, it may not be practical, for example, due to processing power requirements. Thus, preferably, the covariate input signals to the expected state model and/or the sensor object model are a subset of the all covariate signals of the plant. The latter can save processing power that is being used by the expected state model. The expected state model and/or the sensor object model can thus also be made faster. In order to preserve the accuracy of the expected state model and/or the sensor object model the processing unit may determine covariates that are dominant for the respective model. The dominant covariates, which are preferably a subset of all the covariates, can be determined via the processing unit by analyzing the predictive power of each covariate signal on the respective model. Accordingly, if a variation in a covariate does not influence the model output, the covariate is prevented as an input to the model. The processing unit may use historical time-series data for analyzing the predictive power of each covariate signal of the plant on each monitored signal. The processing unit can thus determine the expected state model and/or the sensor object model with a subset of selected covariate inputs that observably influences the model output.

The covariates may be analyzed not only by considering respective sensor data that has occurred at the same or around the same time, but also by analyzing them with an additional time lag. The time lag may be one or more time periods between an occurrence in a covariate and detecting for an effect of that occurrence as a given sensor's output. This allows capturing the interdependencies that are associated with a delay or a time-constant. As an example, if at time t, fuel input to a furnace was increased, a temperature rise in the liquid heated by the furnace may only have been detected at time $t+t_d$. Where, $t_d$ represents a time lag in the system. The applicant has realized that this can allow the most important covariate signals to be determined even though they might have been falsely ignored, were the effect of such a covariate not analyzed with the lag.

According to an aspect, the processing unit selects the type of expected state model by analyzing which model type provides the lowest error between the expected output and the actual output. For example, the error can be measured by calculating, between the expected output and the actual output, any one or more of: an absolute error value, a mean-square error value, a weighted mean-square error value, or even their combination. For calculating one or more of these values, the expected state model may be trained, for example, with a specific portion of the historical time-series data, and the error may be calculated by applying the trained expected state model on the covariate signal data from another portion of the time series data. The output of the trained model in response to this covariate signal data may be compared with the actual output in the historical data to calculate the error. The processing unit may evaluate a plurality of model types each based on a different prediction method and then pick the model which provides the lowest error. In some cases, the model with a given accuracy performance score may be selected. For example, the score may be a figure of merit ("FOM"), such as the lowest "(mean absolute error)*(processing resources)". FOM may be generated from other types of error or other metrics as well. Processing resources may be indicative of processing time, energy, or their combination used by the processing unit for performing the prediction functions with the model.

The weighted mean square error may for example be calculated by assigning different weights to one or more different sections of the training data. This has an advantage that model accuracy can be improved by focusing the model behavior around the one or more sections of the time-series historical data that reflect the sensor behavior more accurately.

The determination of the model type may usually be done as an initial step. As discussed, the error and/or FOM analyses can be done based on the historical sensor data. One or more expected state models that are under evaluation may be trained by specifying a time window on the historical time series data. The trained expected state models(s) may then be compared by the processing unit for error and/or performance, for example, by using the rest of the historical time series data for the sensor. For this, the processing unit may also determine the covariate signals to be used as input to the model. As discussed, these may either be all covariates of the plant, or a subset thereof. The subset may either be at least partially specified by a user, or as explained earlier, the processing unit may at least partially select the dominant covariates based on the predictive power of each of the covariates on the model output. The processing unit can then select the best suited expected state model for generating the sensor's expected output with current time series data from the sensor.

As indicated previously, similar approaches as discussed above for the sensor expected state model can also be used for the sensor object model.

Preferably the training data for training the sensor expected state model contains sensor data related to the normal operating conditions. Training based on undesired operating conditions can be prevented or reduced in this case. By doing so, undesired deviations in the sensor data can be better captured. Similarly, the sensor object model is also preferably also trained with residual data related to the normal operating conditions. This, thus, can have a synergistic effect when used with the proposed sensor object, i.e., monitoring of level and association signals, by condensing the number of parameters to be monitored whilst an improved visibility of undesired variations in the sensor data caused by an anomaly. For the expected state model as well, this can improve the visibility of an abnormal sensor output.

According to yet another aspect, the plurality of sensors is subdivided into categories such as sensors belonging to a plurality of plant areas. The sensors belonging to each plant area, or plant area sensors, may be subdivided into sensors belonging to a plurality of process groups. The sensors belonging to each process group, or process group sensors, may be subdivided into sensors belonging to a plurality of sensor objects. In the context of above, it will be appreciated that each sensor object is realized by grouping the time-series output data from the sensors belonging that sensor object. An advantage of structuring the plurality into plant areas can be to allow an easier navigation in a user interface ("UI") to parts of the plant which are of interest to the user. For configuring each process group, the sensors or tags belonging thereof are configured either as covariates, or as tags to be monitored. The distinction between a covariate tag and a monitored tag is mutually exclusive within the same process group, however a monitored tag in a process group can also be a covariate in another process group. As it will be appreciated, the subdivision into sensor objects is done based on the sensor data that is to be monitored simultaneously. Level signal and association signal are thus the indicators that are monitored for each sensor object, as explained earlier. As an example, if the plant is a thermal power plant, then the plurality of sensors in the thermal power plant can be subdivided or tagged according to plant areas such as: water reservoir, generation unit, switch yard, etc. The generation unit area may be subdivided into process groups such as: boiler, feedwater loop, turbine, condenser, generator, etc. Monitoring object or sensor object may be created either from sensors belonging to the same process group, or it may be created from sensors belonging to different process groups. Such subdivision of the plant can also help in reducing the number of covariates that are relevant for the prediction using the expected state model and/or the sensor object model. Thus, rather than using all covariate signals available in the plant for a given observed sensor or sensor object, only the covariates that are located close to the observed sensor or the sensor object can be considered. There may still be some covariate signals that are relevant for essentially all observed sensors or sensor objects, for example, ambient temperature, however other covariates that have a more localized influence within certain areas of the plant may be ignored for the other areas. Subdivision as proposed can thus further simplify generating the expected state model and/or the sensor object model.

For generating the residue signal for each individual sensor, the proposed teachings provide two distinct states for the sensor, i.e., an actual state, which represents the observed or measured output value of that individual sensor at any given time t, and an expected state which represents an expected value for that sensor at the time t. The expected state is preferably defined from the normal plant operation mode or operation. The actual state of the sensor is compared with the expected state of the sensor to generate the residual signal for that sensor. The residual signal thus represents the deviation of the actual or observed state from the expected state of the sensor.

As discussed also previously, when the level signal value changes beyond an expected level signal value or a given level signal limit, the level event signal is generated. Similarly, when the association signal value changes beyond an expected association signal value or a given association signal limit, the association event signal is generated. For either of the signals, the limit value can either be an absolute value or it may be a value relative to the respective signal value. Same can apply also to the threshold values for the residual signal. As it was explained previously, the thresholds and limits can be defined as per application. According to another aspect, one or both thresholds for a residual signal is determined by the processing unit using a control chart. According to yet another aspect, one or both limits for either one or both of the level signal and the association signal are determined by the processing unit using a respective control chart. It will be understood that the control chart is generated using the respective residual or score data. According to an aspect, the limits are defined as a quantile value, for example of the expected values of the respective score. As a non-limiting example, the upper control limit may be 99.5% quantile or thereabouts. As a further non-limiting example, the lower control limit may be 0.5% quantile or thereabouts.

According to an aspect the expected state model and/or the sensor object model is retrained between one or more predetermined time intervals. By doing so, expected state determination can be correctively recalibrated by taking into account a change in response of the sensor(s) that may be caused by natural factors such as ageing and/or drift in calibration, etc. The model retraining may also be triggered automatically in response to the model performance going below a minimum performance threshold of the model. Alternatively, or in addition, the sensor object model retraining may be automatically triggered in response to a change in the process parameters, such as a user input to change the plant output, for example increase or decrease in production. The retraining can thus capture the change in the behavior of the equipment and/or the plant.

According to an aspect, the level signal value is generated using a distance estimator, for example, the T2-Hotelling statistic on the residual data of the sensor object. The T2-Hotelling is a generalization of the t-statistic and indicates deviations from the multivariate mean of a group of variables. In general, the higher the value of the T2-Hotelling statistic, the more distant is an observation from the mean. When used for computing the level signal, it can indicate when and how much the residual data deviates from its normal or expected or mean state. Any suitable distance estimator may be used for computing the level signal. According to further an aspect, the association signal value is generated using a measure of multivariate dependencies, for example, the Generalized Variance ("GV") statistics on the residual data of the sensor object. The GV may be calculated as the determinant of the variance-covariance matrix of a sample of observations and is a multivariate generalization of the variance. It can therefore be used to measure at a given time the dispersion of time-series residual data in a sensor object. Each of the signal values are calculated for time-series residual data from a respective time window, each being of a specific length. The time window can be selected based, for example, on the quality of the training data.

According to an aspect historical level signal and/or association signal are recorded as a time series data on a database functionally connected to the processing unit.

According to an aspect any of the time series data (e.g., the sensor time series data and/or the residual data and/or the level signal data and/or the association signal data) also comprise annotation data. Annotation data can be provided via a user input, but in some cases it may even be at least partially automatically provided by the processing unit. The annotation data may be provided with types and/or levels. The annotation type may classify features of the data such as what a certain section of the time series data relates to, for example, maintenance activity, breakdown, data issue, etc. The level type may specify for which level in plant the annotation relates to. For example, a plant level may be used to refer to an annotation that relates to all sensor objects and their sensors, an area level may refer to an annotation relating to all sensor objects and their sensors that belong to a specific plant area, similarly process group level, sensor object level and even sensor level annotations may be specified. According to an aspect, the processing unit automatically selects, using one or more annotations, a suitable portion of historical data for training the expected state model and/or the sensor object model. For example, the processing unit may avoid historical time windows that include a certain type of annotation within the time series. By doing so, it can be avoided that the models and trained on inconsistent data. Model accuracy can thus be improved by selecting training data that provides proper information on normal plant or equipment operation. According to an aspect, the processing unit automatically places annotations to define a historical time window according to desired limit(s) and/or threshold(s) for the score(s) and/or residual(s) respectively. This can thus be used to influence how tightly the observed signal(s) need to track the expected signal(s). The user specified annotations may be received with a user interface ("UI") and, for example, stored in an analysis database. The annotations may even include timestamp(s) for specifying the start and end of the annotation. The annotations may even be used to retrieve the desired sections of the time series data.

In some plants, creeping processes, such as fouling of a pipe, may cause slow trends or drift in the sensor data. Such trends may cause slow rise or droop in the sensor data values over time. The trends may have a small slope or rate of change, which may result in that a given detectable change in the sensor output caused by such a creeping process takes for example, a week, several weeks or even months to appear. A retraining of the expected state model and/or the sensor object model can cause such slow trends to become undetectable by monitoring the level and/or association signals, as well as residuals. To prevent this, the processing unit may perform a trend detection. The applicant has found the calculation of the strength, smoothness and currentness of the historical data of the sensor can be particularly useful in detecting the drift in the time series data.

Accordingly, the method can also comprise:

detecting, via any of the one or more processing units, a drift in the output signal of a sensor; wherein the sensor is among the at least some of the sensors, and wherein the drift is computed from the historical time series data of the sensor, the historical data of the sensor being from a time period that is at least 1 week long, and wherein the drift is detected by computing the strength, smoothness and currentness of the historical data of the sensor.

Those skilled in the art shall appreciate that strength in this context refers to strength of the signal trend. The strength may thus be represented via a measure for the slope of the trend. The strength describes the intensity and recognizability of the drift that can be measured, for example, using a Mann-Kendall test on the historical data of the sensor. Such a test results in a value score that can indicate whether a trend can be detected and whether it is a positive or a negative trend. A measure of the strength can thus indicate whether the trend or drift is weak or strong.

The smoothness describes whether the drift is rather smooth or if it is caused by a more abrupt level shift in the historical data. The smoothness thus represents standardized measurement of the degree of absence of abrupt features in the data, such as spikes, level-shifts etc. Presence of such features may add to the uncertainty in the trend, for example, the strength of the trend may be artificially inflated or deflated. The present teachings thus propose using the smoothness value in context of the strength and currentness to detect or compute the drift in the output signal the sensor, which will be closer to the actual drift in the sensor output.

There can even be trends which had been active over a long period of time, such as several weeks or months, and are thus recognizable if a time window of several weeks or months is considered, but which may have since cooled down, or are not active anymore, in recent time. Such characteristics may be detected using the currentness or actuality test. Currentness, prevalence or contemporaneity of the trend refers to a measurement whether the actual trend being identified during the time of observations is part of a long-term evolving trend in the sensor output data. It can thus be ignored such drifts that are not active anymore.

Thus, the above criteria can synergistically allow detecting actual drifts that can have bearing into anomalies or potential anomalies. This can thus allow preserving such actual drifts whilst ignoring such variations in the sensor output that do not represent or are not likely to represent anomalies. Thus, despite retraining of the expected state model, a more reliable visibility can be maintained on the more slow-moving effects that have not manifested yet as anomalies.

According to an aspect, the time period for computing drift is a duration that is 1 month or around 1 month long. Additionally or alternatively, according to another aspect, the duration is 3 months or around 3 months long. Additionally or alternatively, according to yet another aspect, the duration is 6 months or around 6 months long. Preferably the historical data is the duration long portion of time-series data until essentially the time at which trend detection is being performed.

The present teachings, e.g., related at least partially to a black-box monitoring method, can also be used to provide a monitoring system for the plant as was outlined above. Accordingly, there can also be provided a monitoring and/or control system for a plant comprising a plurality of sensors, wherein the system comprises one or more processing units configured to perform any of the method steps herein disclosed.

For example, there can be provided a monitoring and/or control system for a plant comprising a plurality of sensors, and the system comprising one or more functionally connected processing units, the system being configured to:
- generate, via any of the one or more processing units, time-series residual data of a sensor object; the sensor object being a group of at least some of the sensors from the plurality of sensors, and wherein the residual data comprises, for each of the sensors of the sensor object, a residual signal which is a difference between the sensor's measured output and the sensor's expected output,
- monitor, via any of the one or more processing units, a level signal; wherein the level signal is indicative of a collective time-based variation of the time-series residual data,
- monitor, via any of the one or more processing units, an association signal; wherein the association signal is indicative of the variation and/or association structure of the time-series residual data,
- generate, via any of the one or more processing units, an anomaly event signal when at a given time a value of the level signal and/or a value of the association signal changes from an expected value of the respective signal at or around that time.

Similarly, when viewed from another perspective, there can also be provided a monitoring and/or control system for a plant comprising a plurality of sensors, and the system comprising one or more functionally connected processing units, the system being configured to:
- provide, at any of the one or more processing units, time-series residual data of a sensor object; the sensor object being a group of at least some of the sensors from the plurality of sensors, and wherein the residual data comprises, for each of the sensors of the sensor object, a residual signal which is a difference between the sensor's measured output and the sensor's expected output,
- monitor, via any of the one or more processing units, a level signal; wherein the level signal is indicative of a collective time-based variation of the time-series residual data,
- generate, via any of the one or more processing units, a level event signal; wherein the level event signal is generated when at a given time a value of the level signal changes from an expected value of the level signal at or around that time, wherein the level event signal is indicative of an anomaly in at least one of the equipment in the plant.

Also similarly, when viewed from yet another perspective, there can also be provided a monitoring and/or control system for a plant comprising a plurality of sensors, and the system comprising one or more functionally connected processing units, the system being configured to:
- provide, at any of the one or more processing units, time-series residual data of a sensor object; the sensor object being a group of at least some of the sensors from the plurality of sensors, and wherein the residual data comprises, for each of the sensors of the sensor object, a residual signal which is a difference between the sensor's measured output and the sensor's expected output,
- monitor, via any of the one or more processing units, an association signal; wherein the association signal is indicative of the variation and/or association structure of the time-series residual data,
- generate, via any of the one or more processing units, an association event signal; wherein the association event signal is generated when at a given time a value of the level signal changes from an expected value of the association signal at or around that time, wherein the association event signal is indicative of an anomaly in at least one of the equipment in the plant.

The method, or the system, can be used for detecting unusual behavior and abnormal patterns in the sensor data via the proposed automated data driven technique. The teachings can benefit plant operator, by allowing a more efficient tracking of large sensor datasets, for example by guiding an operator's attention at an early stage to an area of the plant where an action may be required in the future. As outlined previously, the teachings can also be used to provide a prediction of the upcoming maintenance requirements related to the plant. According to an aspect, the teachings can also be used to realize an automated system for plant maintenance forecasting and control thereof.

The user interface can be any suitable human-machine-interface ("HMI") that allows a user to interact with the monitoring system. The human machine interface ("HMI") may comprise any one or more of; a monitoring panel, a video display unit (e.g., an LCD (Liquid Crystal Display), a CRT (Cathode Ray Tube) display, or a touch screen), an alphanumeric input device (e.g., a keyboard), a cursor control device (e.g., a mouse), and/or a signal generation device (e.g., a speaker). The HMI thus can, for example, be visual interface such as a panel, a screen and/or it can be an audio interface such as a loudspeaker. Accordingly, the output can either be displayed to the user and/or it can be announced via the speaker.

The processing unit may be a computer or even a general-purpose processing device such as a microprocessor, microcontroller, central processing unit ("CPU"), or the like. More particularly, the processing unit may be a CISC (Complex Instruction Set Computing) microprocessor, RISC (Reduced Instruction Set Computing) microprocessor, VLIW (Very Long Instruction Word) microprocessor, or a processor implementing other instruction sets or processors implementing a combination of instruction sets. The processing unit or processing means may also be one or more special-purpose processing devices such as an ASIC (Application-Specific Integrated Circuit), an FPGA (Field Programmable Gate Array), a CPLD (Complex Programmable Logic Device), a DSP (Digital Signal Processor), a network processor, or the like. The methods, systems and devices described herein may be implemented as software in a DSP, in a microcontroller, or in any other side-processor or as hardware circuit within an ASIC, CPLD, or FPGA. As outlined also earlier, it is to be understood that the term "processing unit" or processor may also refer to one or more processing devices, such as a distributed system of processing devices located across multiple computer systems (e.g., cloud computing), and is not limited to a single device unless otherwise specified. Moreover, any one or more of the processing units may be located at a physical location which is different from the other processing units.

When viewed from another perspective, there can also be provided a computer program comprising instructions which, when the instructions are executed by any one or more suitable processing units of a plant monitoring and/or control system functionally connected to a plurality of sensors, cause the system to carry out the method steps herein disclosed.

For example, there can be provided a computer program comprising instructions which, when the program is executed by one or more functionally connected processing units of a plant monitoring and/or control system functionally connected to a plurality of sensors, cause the system to:
  generate, via any of the one or more processing units, time-series residual data of a sensor object; the sensor object being a group of at least some of the sensors from the plurality of sensors, and wherein the residual data comprises, for each of the sensors of the sensor object, a residual signal which is a difference between the sensor's measured output and the sensor's expected output,
  monitor, via any of the one or more processing units, a level signal; wherein the level signal is indicative of a collective time-based variation of the time-series residual data,
  monitor, via any of the one or more processing units, an association signal; wherein the association signal is indicative of the variation and/or association structure of the time-series residual data,
  generate, via any of the one or more processing units, an anomaly event signal when at a given time a value of the level signal and/or a value of the association signal changes from an expected value of the respective signal at or around that time.

Similarly, when viewed from another perspective, there can also be provided a computer program comprising instructions which, when the program is executed by one or more functionally connected processing units of a plant monitoring and/or control system functionally connected to a plurality of sensors, cause the system to:
  provide, at any of the one or more processing units, time-series residual data of a sensor object; the sensor object being a group of at least some of the sensors from the plurality of sensors, and wherein the residual data comprises, for each of the sensors of the sensor object, a residual signal which is a difference between the sensor's measured output and the sensor's expected output,
  monitor, via any of the one or more processing units, a level signal; wherein the level signal is indicative of a collective time-based variation of the time-series residual data,
  generate, via any of the one or more processing units, a level event signal; wherein the level event signal is generated when at a given time a value of the level signal changes from an expected value of the level signal at or around that time, wherein the level event signal is indicative of an anomaly in at least one of the equipment in the plant.

Also similarly, when viewed from yet another perspective, there can also be provided a computer program comprising instructions which, when the program is executed by one or more functionally connected processing units of a plant monitoring and/or control system functionally connected to a plurality of sensors, cause the system to:
  provide, at any of the one or more processing units, time-series residual data of a sensor object; the sensor object being a group of at least some of the sensors from the plurality of sensors, and wherein the residual data comprises, for each of the sensors of the sensor object, a residual signal which is a difference between the sensor's measured output and the sensor's expected output,
  monitor, via any of the one or more processing units, an association signal; wherein the association signal is indicative of the variation and/or association structure of the time-series residual data,
  generate, via any of the one or more processing units, an association event signal; wherein the association event signal is generated when at a given time a value of the level signal changes from an expected value of the association signal at or around that time, wherein the association event signal is indicative of an anomaly in at least one of the equipment in the plant.

When viewed from yet another perspective, there can also be provided a computer-readable data carrier having stored thereon the computer program herein disclosed. Accordingly, there can also be provided a non-transitory computer readable medium storing a program causing a suitable a processing unit of a plant monitoring and/or control system to execute any method steps herein disclosed.

A computer-readable data carrier includes any suitable data storage device on which is stored one or more sets of instructions (e.g., software) embodying any one or more of the methodologies or functions described herein. The instructions may also reside, completely or at least partially, within the main memory and/or within the processor during execution thereof by the computer system, main memory, and processing unit or device, which may constitute computer-readable storage media. The instructions may further be transmitted or received over a network via a network interface device.

The computer program for implementing one or more of the embodiments described herein may be stored and/or distributed on a suitable medium, such as an optical storage medium or a solid-state medium supplied together with or as part of other hardware, but may also be distributed in other forms, such as via the internet or other wired or wireless telecommunication systems. However, the computer program may also be presented over a network like the World Wide Web and can be downloaded into the working memory of a data processor from such a network.

When viewed from another perspective, a data carrier or a data storage medium for making a computer program element available for downloading can be also provided, which computer program element is arranged to perform a method according to one of the previously described embodiments.

The word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. The term "functionally connected" may also be read as "operatively connected" or being connected in a direct or indirect manner. Any reference signs in the claims should not be construed as limiting the scope.

Example embodiments are described hereinafter with reference to the accompanying drawings.

Figure 2:
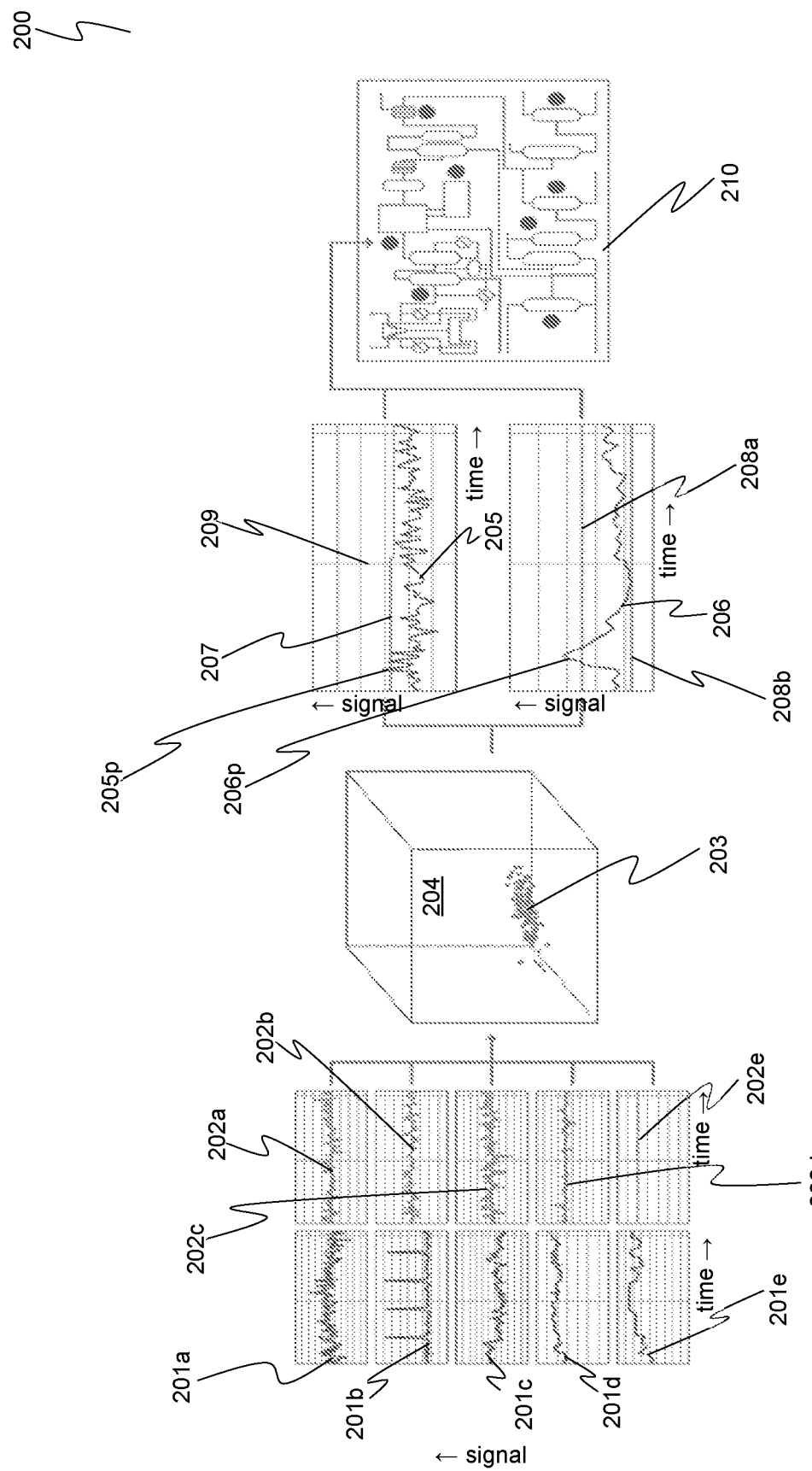
Figure 3:
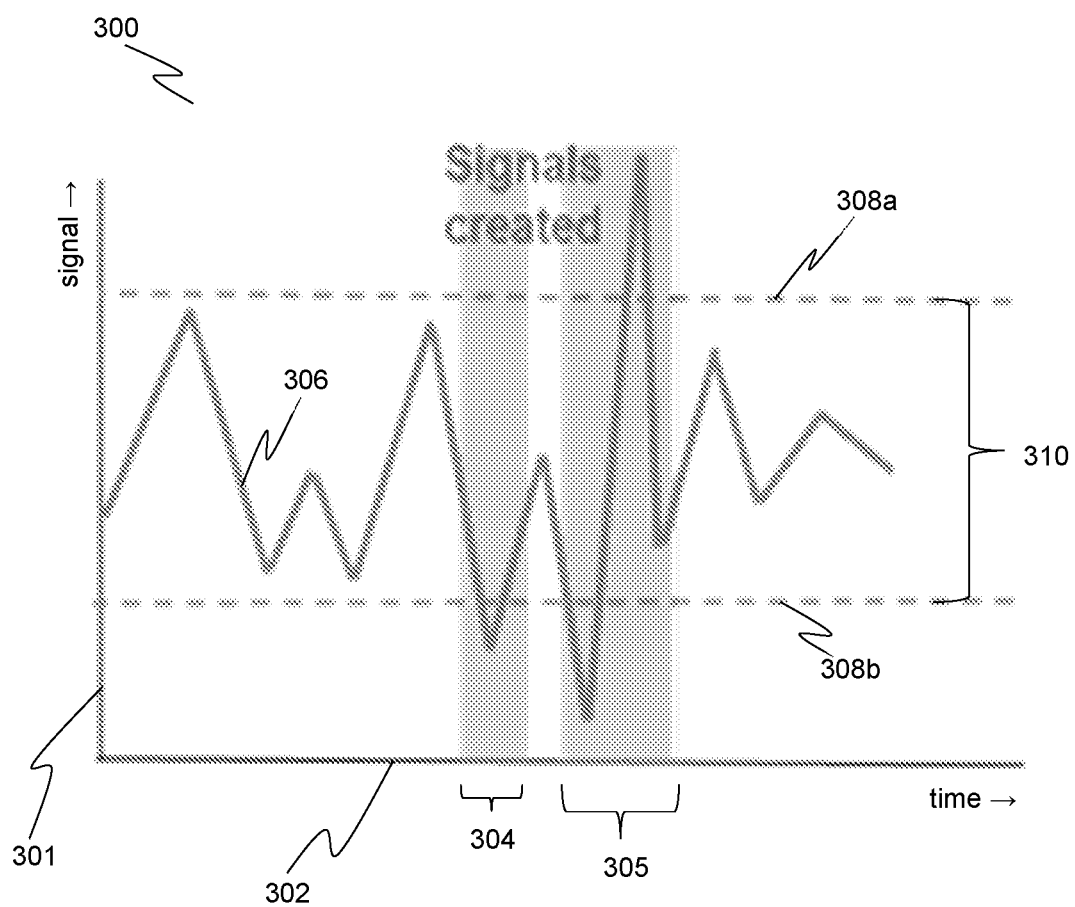
Figure 4:
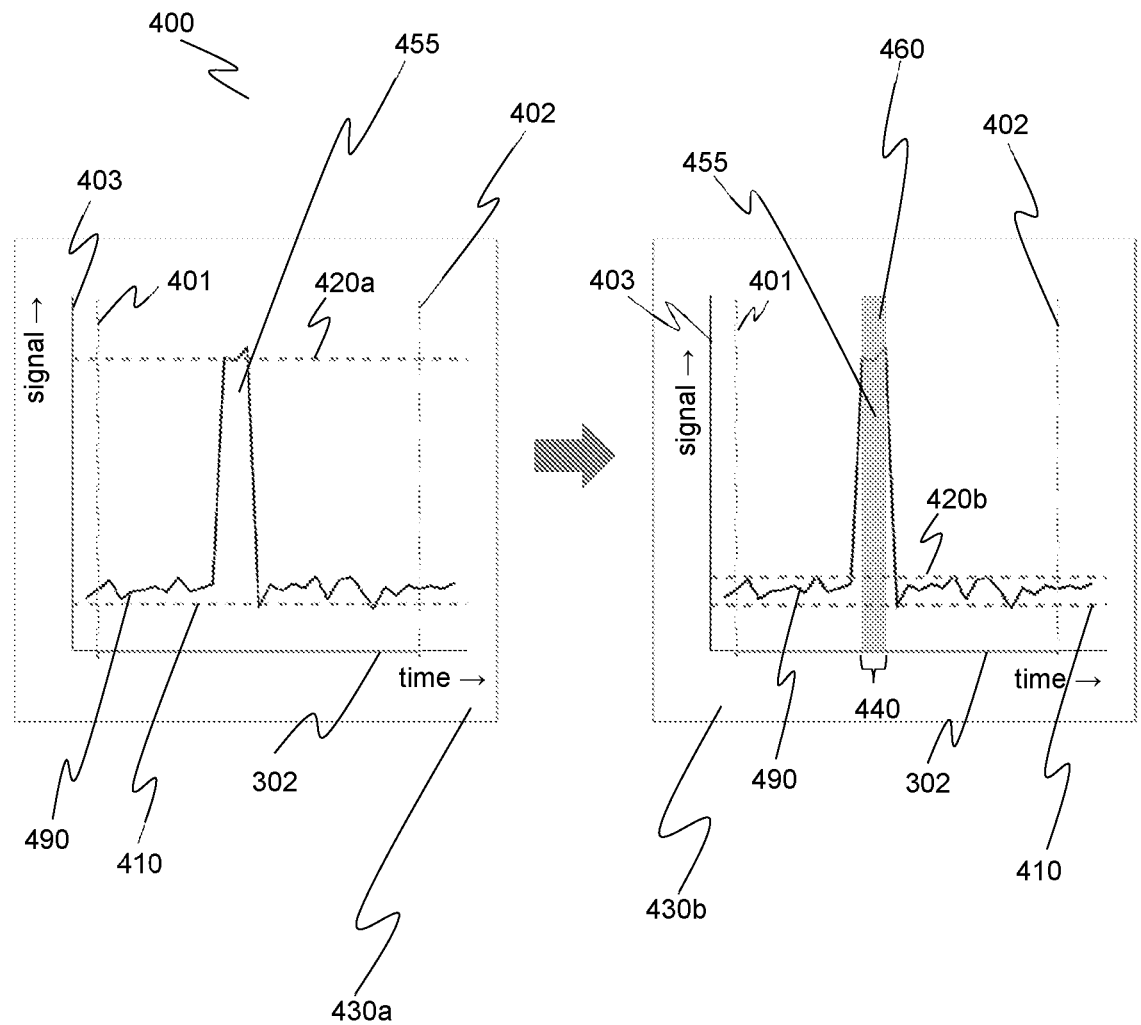
Figure 5:
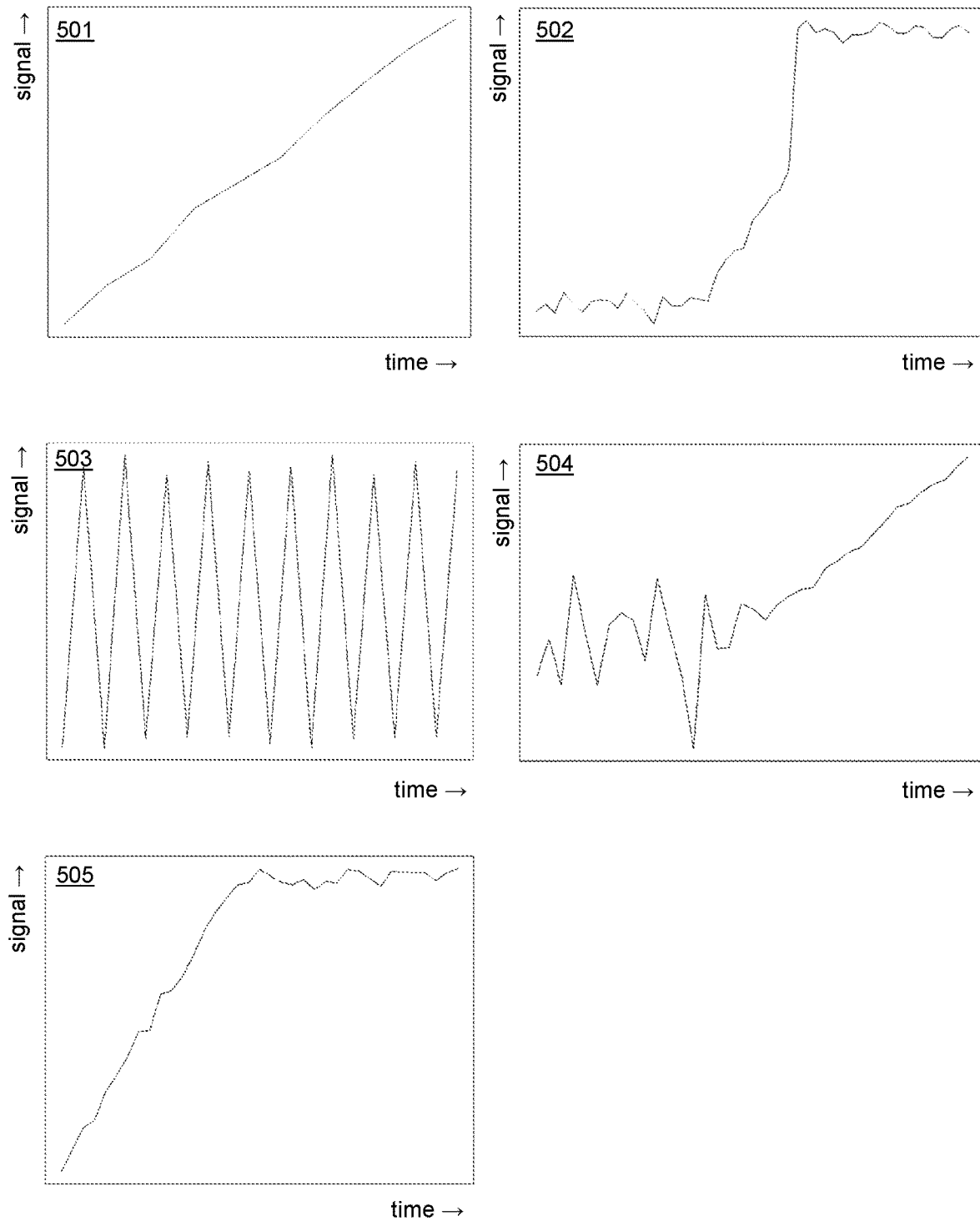

FIG. 1 shows an example industrial plant where certain aspects of the present teachings can be applied FIG. 2 shows a block diagram with some of the signals that are generated pursuant to the present teachings FIG. 3 shows a plot of General Variance statistic signal pursuant to the present teachings FIG. 4 shows an effect of annotation on the control limits FIG. 5 shows certain examples of trend detection

DETAILED DESCRIPTION

FIG. 1 shows an example 100 of a plant 101 for the purpose of illustrating how at least certain aspects of the present teachings can be applied. In the layout 100 an industrial plant 101 is shown. The plant comprises a plurality of equipment and sensors. The plant also comprises a processing unit 110, which is shown distributed in three parts 110a, b and c.

A first group 102 of equipment and sensors, and a second group 103 of equipment and sensors are shown that are a part of the plant. The plant 101 is used for producing one or more industrial products 150. The product 150 can be any physical product or a service product as was outlined earlier. For example, the product 150 can be a chemical or pharmaceutical product. The architecture or process shown in the example 100 is not of importance to the generality or scope of the present teachings. In this example, the first group 102 is located at a different location than the second group 103. An intermediate product is provided by an output of the first group 102, as an input product to the second group 103. The intermediate product is shown provided via a transport medium such as a pipeline 188, which can, for example, be a long pipeline. This is shown to demonstrate that the most of the first group 102 equipment may be relatively isolated from the second group 103 equipment. There may be interdependencies between the first group 102 and the second group 103, for example, due to parameters of the intermediate product that is being transferred via the pipeline 188. However, there may be certain factors that are common to the two groups 102 and 103, for example, ambient pressure and temperature. Such ambient parameters may have an influence on the process parameters or sensor outputs on both sides. As per relevance to the process, any of such ambient parameters may thus be considered what was termed earlier as a covariant signal.

Both the first group 102 and the second group 103 comprise a plurality of sensors, for example, temperature sensors 132, 133, 142 and 148, pressure sensors 131, 135, 136 and 145, flow sensors 138, 143 and 147. The equipment in both groups includes heat exchanger 130, separation chamber 139, reaction tank 120, cooling unit 140, filter 151, fan 141, and pumps 134, 144 and 149.

The sensors from the first group 102 are monitored by the processing means 110, or more specifically by a first processing unit 110a. Signals from the sensors in the first group 102 are shown received via a first communications means 105a. The communications means 105a can be any means, wired, wireless or their combination, that is suitable for transmitting signals or data from the sensors. For example, the first communications means 105a can be a bus as shown. The data received by the first processing means 110a may be processed by the first processing means 110a and/or by any other processing means 110b and c. At least some data may also be stored in a memory or database 111. The database 111 can either be at a single place or it may be distributed as shown as 11a, b and c. In addition to monitoring, the first processing unit 110a may also perform control functions, for example, via a control bus 106a. The control bus 106a of the first processing unit 110a may be any communications means as discussed earlier in context of the bus 105a. In some cases, the bus 105a and the control bus 106a may even be the same bus or communications means. The control functions may include, for example, control of the pump 134. The processing unit 110 may even be provided by an HMI 112. The HMI 112 may either be provided at each of the distributed processing units 110a, b and c, as shown, or it may be provided at any one or more of them. The HMI may comprise a monitoring panel or a video screen and one or more input devices such as a keyboard or mouse for a user to interact with the processing means 110. The HMI may also comprise an audio device such as a loudspeaker. Events such as alarms may be communicated audibly and/or visually via the HMI.

Similarly, the sensors from the second group 103 are monitored by the processing means 110, or more specifically by a second processing means 110b. Signals from the sensors in the second group 103 are shown received via a second communications means 105b. The second communications means 105b can be any means, wired, wireless or their combination, that is suitable for transmitting signals or data from the sensors. For example, the second communications means 105b can be a bus as shown. The data received by the second processing means 110b may be processed by the second processing means 110b and/or by any other processing means 110a and c. Here also, at least some data may also be stored in a memory or database 111. In addition to monitoring, the second processing unit 110b may also perform control functions, for example, via a second control bus 106b. The control functions may include, for example, control of: the pumps 144 and 149, the fan 141, and valve 146. The second control bus 106b of the second processing unit 110b may be any communications means. In some cases, the bus 105b and the control bus 106b may even be the same bus or communications means.

The first processing unit 110a and the second processing unit 110b are functionally connected via data link 190, which may be any suitable communications medium, wired, wireless or their combination. The processing units are thus able to exchange data that may include any data or signals such as sensor data, status data and event signals. The data link may even be used for transferring data from one database or memory to the other.

In some cases, a separate processing unit, e.g., a third processing unit 110c, may be provided. The third processing unit 110c may be at a higher hierarchy and may be a plant level monitoring and/or control system. The third processing unit 110c may either be at the same location as the plant, or it may even at least partially be at another location than the plant, for example, it may be a cloud-based platform. In some cases, the third processing unit 110c may be within the plant, but its database 111c may be implemented as a cloud storage or vice versa. The supervisory processing unit 110c may even be located at another plant located at a different site than the plant 101. In some cases, the third processing unit 110c may even be located in between the first and the second processing units 110a and b, i.e., data link 190 being divided into two sections, first between the first unit 110a and the third unit 110c, and the second between the third unit 110c and the second unit 110b. A specific architecture of the processing units or the plant is not essential to the scope or generality of the present teachings.

The another plant may even be located in another country. For that sake, it is possible that even the first group 102 and the second group 103 are located in different plants or countries. For example, a supplier plant and a consumer plant connected via a gas pipeline may be located in different countries.

Any of the processing units 110a, b and c, and the databases 111a, b, c may be implemented as a cloud-based service, for example provided by a third-party. In some cases, the processing units 110*a*, *b* and *c*, and/or the databases 111*a*, *b*, *c* may be at the same place or they may even be the same unit.

For monitoring the equipment, a conventional system may monitor the state of one or more sensors individually. For example, the output signal from the temperature sensor 148. A rising temperature may be used to indicate overheating of the pump 149, for example due to a reduced flow caused by a blockage in the filter 151. However, in reality, the increase in the temperature may have been caused due to ambient temperature increase. Such a system may thus lead to false positive events indicating an anomaly.

In order to solve the problem, the second processing unit 111*b* may compare the measured or observed output value of the temperature sensor 148 from its expected value at that time. The expected value may be generated by an expected state model of the temperature sensor 148. In order to improve the expected state prediction, the model e.g., neural network may be trained using the historical time series data of the sensor 148, preferably under desired operating conditions. To further improve the prediction, the expected state model may be input with covariate signals that influence the output of the sensor 148. For example, ambient temperature may be one of the covariate signals. There may be other signals or parameters from the second group 103 that influence the output of the sensor 148, such covariates are recognized during a model building phase of the expected state model. The processing means 110 may use the entire covariate pool of the whole plant 101 to check, using the historical data, which of the covariates have an effect, or possess predictive power, on the output of the sensor 148. The covariates that have measurable influence on the output of the sensor 148 are thus selected as model in puts. When the model is deployed on the processing unit 110, residual signal is generated for the output of the sensor 148, which is a difference between the observed sensor output value and the output of the expected state model at that given time. If the sensor is behaving normally, the residual signal will be mostly random noise.

In order to make the anomaly detection further immune to noisy spikes and such imperfections in the residual signal, the present teachings propose creating a sensor object. The sensor object refers to a group of sensor residual signals that are consolidated and monitored together. The group of sensor residual signals are time series residual signals that are received from a pre-selected plurality of sensors. The pre-selected plurality of sensors may either be selected manually, or at least partially automatically via the processing unit 110. The processing unit may decide this for example, based on similarity in sensor response, sensor types, covariate dependencies, or their combination. The group of sensor residual signals or residual data are then analyzed by the processing unit 110 to compute a level signal. The level signal is indicative of a collective time-based variation of the time-series residual data. The time dependent level signal value is then compared with an expected level signal value at that time. The processing unit 110 may generate a level event signal at any given time when the value of the level signal changes beyond the expected level signal value at or around that time. The level event signal is deemed indicative of an anomaly in at least one of the equipment in the plant. In this example, when the level signal breaches the expected level signal, the processing unit 110 may issue an alarm. Furthermore, the processing unit 110 may check for which of the sensors in the sensor object the sensor output breached the expected sensor output value at or around the time the level event signal was generated. This is used by the processing unit 110 to find the source of the anomaly.

The expected level signal value is preferably generated by the processing unit 110 using a sensor object model. The sensor object model is a predictive model or a neural network that has been trained using historical residual data.

Preferably, the expected level signal is provided as a value range within which the level signal may lie. Thus, one or more limit values for the level signal may be provided. The level event signal is generated when the observed level signal value goes beyond an expected level signal limit. The expected level signal limit may be an upper expected level signal limit and/or a lower expected level signal limit.

Preferably, the processing unit computes another score for making the anomaly detection further immune to noisy spikes in the residual signal. Namely, a time-dependent association signal value is generated. The group of sensor residual signals or residual data are thus analyzed by the processing unit 110 to compute an association signal. The association signal is indicative of the variation and/or association structure of the time-series residual data. The time dependent association signal value is then compared with an expected association signal value at that time. The processing unit 110 may generate an association event signal at any given time when the value of the association signal changes beyond the expected association signal value at or around that time. The association event signal is deemed indicative of an anomaly in at least one of the equipment in the plant. Again referring to the example, when the association signal breaches the expected association signal, the processing unit 110 may issue an alarm. Furthermore, the processing unit 110 may check for which of the sensors in the sensor object the sensor output breached the expected sensor output value at or around the time the level event signal was generated. This may also be used by the processing unit 110 to find the source of the anomaly.

The expected association signal value is preferably generated by the processing unit 110 using the sensor object model.

Preferably, the expected association signal is provided as a value range within which the association signal may lie. Thus, one or more limit values for the level signal may be provided. The association event signal is generated when the observed association signal value goes beyond an expected association signal limit. The expected association signal limit may be an upper expected association signal limit and/or a lower expected association signal limit. The limits can also be termed as control limits.

Breaching of any one or both of the level signal and association signal their respective expected or limit values may be considered as indicative of an anomaly.

In order to capture the anomalies that may slowly manifest themselves, the processing unit 110 may even perform a trend detection. Due to retraining of the models, slow moving drifts may get eliminated from observation by the level and association monitoring. The values: strength, smoothness and currentness, prevalence or contemporaneity of the historical data of the sensor calculated for by the processing unit for detecting the drift in the sensor time-series data.

Although in the above discussion it may specific functions may have been referred to as being performed by "the processing unit 110", it will be understood that in some cases it may even be implemented as being performed via any of the one or more processing units 110*a*, *b* and *c*. It will also be understood that in some cases there may be additional processing units. For example, some sensors may even be provided a dedicated processor that is configured to calculate the residual signal for that sensor. In that case, the residual signal for such sensors may be directly provided at the processing unit 110 as an input.

Similarly, also for the first group 102, the processing unit 110, for example in some cases the first processing unit 110*a* may monitor another sensor object via the corresponding one or both level and association signals for that object. Each group may have more than one sensor object.

In response to an event signal, the processing unit may backtrack the sensor data to find the source of anomaly, for example as outlined previously. Additionally, the processing unit may forecast the maintenance requirements for the anomaly, for example by providing an estimated date or time by which maintenance should be performed to prevent a certain disruption. Disruption may be calculated as a loss of productivity or as wastage as compared to a planned shutdown for maintenance.

FIG. 2 shows a block diagram 200 representing the signals that are generated and monitored. Charts on the left side show observed and expected values of five different sensors that are grouped in a sensor object. The grouping is preferably done automatically, for example, using self-organizing maps, but it may even be done at least partially based on manual feedback.

First set of curves 201*a* pertains to measured output signal from a first sensor and the expected output thereof. Similarly curves 201*b-e* pertain each to the measured output signal from a second to fifth sensor respectively and their expected outputs. By comparing the measured or observed outputs of each sensor with its respective expected output, respective residual signals 202*a-e* are obtained. For example, the first residual signal 202*a* pertains to the first sensor. As it can be seen, even though the respective sensor outputs shown in curves 201*a-e* were quite different from the outputs from the other sensors, the residual signals 202*a-e* are more homogeneous. As discussed previously, superfluous information from the sensor outputs can been removed as a virtue of generating the residual signals.

It will be clear that the signals are time-dependent, or they comprise time-series values. By combining the residual signals 202*a-e*, a sensor object 204 is realized that comprises multidimensional residual data 203. From the residual data 203, time-dependent level signal or score 205 is shown generated. The level signal 205 is provided an expected level signal limit value 207, which represents a probability space of expected values within which the level signal may validly lie. The expected level signal limit value 207 may also be a time-dependent value. As shown, just after time 209, the expected level signal limit value 207 is reduced by the sensor object model. It can also be seen that 205*p* represents a peak in the level signal 205 when said signal changed beyond an expected value of the level signal, or an expected level signal limit value 207 that that time. Accordingly, in such a case a level event signal would be generated by the processing unit 110. The processing unit may then trace the root cause of the anomaly, for example, by analyzing one or more of the sensor signals 201*a-e*. The processing unit may use effect size calculation for finding one or more sensors that cause the most contribution to the signal change. An alarm may be displayed on a visual monitoring panel 210. For example, the relevant equipment on the panel may be highlighted.

Also, from the residual data 203, time-dependent association signal or score 206 is shown generated. The association signal 206 is provided an expected association signal limit value 208, or more specifically, an upper association signal limit value 208*a* and a lower association signal limit value 208*b*. The distance between these limits represents a probability space of expected values within which the association signal may validly lie. The expected association signal limit values 208*a* and *b* may also be time-dependent values. It can be seen that 206*p* represents a peak portion in the association signal 206 when said signal changed beyond upper expected values of the association signal, or an upper expected association signal limit value 208*a* that that time. Accordingly, in such a case an association event signal would be generated by the processing unit 110. The processing unit may then trace the cause of the anomaly, for example, by analyzing one or more of the sensor signals 201*a-e*. The processing unit may use effect size calculation for finding one or more sensors that cause the most contribution to the signal change. The association score can also detect the rate of change of the movement of the residual signals. Similarly, an alarm may be displayed on the visual monitoring panel 210.

In some cases, it is possible that the event signal for either or both scores is caused by an activity in the plant which results in a deviation in the residual data from the expected states. Such an activity may be a repair or other event that changes be behavior of the observed states. In such cases, the user may be aware what the event is caused by. The user then has a possibility to annotate the event according to a specific classification or type. One or more annotations can thus be fed back to the model such that the model is trained to classify such events in the future.

FIG. 3 shows a plot 300 of Generalized Variance ("GV") that can be used for computing the variation and association structure of the sensor object data. GV can thus be used to generate the association signal 206. The plot 300 shows an association signal 306 with Generalized Variance value on the Y-axis 301 and time on the X-axis 302. Limit values 308 are also shown which may also be called an upper control limit ("UCL") 308*a* and a lower control limit ("LCL") 308*b*. The distance 310 between these values 308*a* and *b* represents a control range or a probability space within which the value of the association signal 306 may validly lie. The values lying within the control range 310 at any given time may thus be called expected values at that time. The control range 310 may also be time dependent, however in this case, it is shown constant.

It can be seen that within a first time-period 304, a value of the association signal 306 changed from an expected value, or in this case changed beyond the lower control limit 308*b* at or around that time. Accordingly, in this case an association event signal would be created or generated.

Similarly, within a second time-period 305, a value of the association signal 306 changed again from an expected value, or in this case changed first beyond the lower control limit 308*b* and then beyond the upper control limit 308*a*. Accordingly, in this case also one or more association event signals would be generated.

Such a chart 300 may also be called a control chart that is used for monitoring numerical statistics of the signals over time. A similar control chart may also be generated for the level signal value statistic.

FIG. 4 shows a couple of charts 400 illustrating how annotation may be used to improve the focus or relevance of training data. The charts 400 are shown as control charts. The left control chart 430*a* shows the control limits 410 and 420*a* for a score signal 490. The score signal in this case is an association signal. Accordingly, Y-axis is an association signal value, e.g., GV statistic. The X-axis 302 represents time. The charts have a peak region 455 which shows abruptly high values for the signal 490. Such high values may have occurred due to an abnormal event such as a maintenance activity in a certain portion of the equipment that includes sensors within the sensor object. The charts also show a start time 401 and an end time 402 compose a time window that can be used for training the sensor model. Were the left chart 430a be used to train the sensor model, the control limits would be determined as shown, i.e., an upper control limit 420a for the unannotated chart 430a and a lower control limit 410. It will be appreciated that such a high upper control limit 420a may not be appropriate to detect a change in the score signal from an expected value at that time. Accordingly, some anomaly events may not be flagged.

This can be addressed by placing an annotation 460 within an annotation time window 440. Accordingly, the processing unit 110 will ignore the data from the peak region 455 for training the model. The effect of the annotation can be seen in terms of the upper control limit 420b of the annotated chart 430b. The latter upper control limit 420b is now more realistic. The lower control limit 410 is unaffected because the annotation pertained only to high values of the score signal 490. Annotation can thus be used to correct the weight of the training data in the normal operating region.

Similar to annotation, choice of time window, i.e., time-period enclosed between the start time 401 and the end time 402 is also selected by the processing means, such that the selected window reflects the normal behavior of the sensor object. Annotations may also be used to mark such windows that are desirable. The control limits can thus be adjusted such that anomalies can be better detected.

As it was discussed previously, the control limits may be statistical quantile limits.

FIG. 5 shows example charts 501-500 for demonstrating how the processing means may perform trend detection. Trend detection as proposed comprises computing three metric values on long term data within time windows at least 1 week long. The three metric values are Strength, Smoothness, and Currentness or Actuality. Trend detection is also used on sensor object. In the following examples, a value between 0 and 1 is assigned for each of the metrics, where 0 indicates false and 1 indicates true. Usually the values are between 0 and 1, indicating a probability of the metric or property of the trend. It will be appreciated that the values indicated below are examples and the limits specified above are not absolute. For example, a scaling factor may be applied, such as any of the value lies between 0 and 100. The values mentioned herein thus should not be taken specified in an absolute sense. For specifying the direction of the trend a sign may also be assigned to the strength value.

The first chart 501 shows a signal in rising trend, the metric values computed for the first chart 501 are: Strength: 1, Smoothness: 0.9, Actuality: 1.

The second chart 502 shows an abruptly rising signal encompassed between a lower noise floor and an upper noise floor. The trend has thus almost died out. The metric values computed for the second chart 502 are: Strength: 0.69, Smoothness: 0.98, Actuality: 0.25.

The third chart 503 shows a signal in the form of a triangular waveform. The metric values computed for the third chart 503 are: Strength: 0.1, Smoothness: 0, Actuality: 0.24.

The fourth chart 504 shows a signal with an initial noisy portion and then a rising trend. The metric values computed for the fourth chart 504 are: Strength: 0.73, Smoothness: 0.97, Actuality: 1.

The fifth chart 505 shows a signal with an initial rising trend and then an upper plateau. The metric values computed for the fourth chart 504 are: Strength: 0.77, Smoothness: 0.97, Actuality: 0.28.

Various examples have been disclosed above for a method for monitoring a plant, a monitoring and/or control system for a plant, and a computer software product implementing any of the relevant method steps herein disclosed. Those skilled in the art will understand however that changes and modifications may be made to those examples without departing from the spirit and scope of the accompanying claims and their equivalents. It will further be appreciated that aspects from the method and product embodiments discussed herein may be freely combined.

Certain embodiments of the present teachings are summarized in the following clauses.

Clause 1.

A method for monitoring a plant comprising a plurality of sensors, and one or more functionally connected processing units, the method comprising:

providing, at any of the one or more processing units, time-series residual data of a sensor object; the sensor object being a group of at least some of the sensors from the plurality of sensors, and wherein the residual data comprises, for each of the sensors of the sensor object, a residue signal which is a difference between the sensor's measured output and the sensor's expected output, monitoring, via any of the one or more processing units, a level signal; wherein the level signal is indicative of a collective time-based variation of the time-series residual data, monitoring, via any of the one or more processing units, an association signal; wherein the association signal is indicative of the variation and/or association structure of the time-series residual data, generating, via any of the one or more processing units, an anomaly event signal when at a given time a value of the level signal and/or a value of the association signal changes from an expected value of the respective signal at or around that time.

Clause 2.

The method according to clause 1, wherein the any of the respective expected value is provided as a corresponding expected value limit specifying for a given time a plurality of expected values, as a range and/or as discrete values, that the corresponding signal may validly have without the anomaly event being generated.

Clause 3.

The method according to clause 1, wherein any of the expected value or expected limit value is a time-dependent value.

Clause 4.

The method according to any of the above clauses, wherein the method also comprises:

determining, in response to the anomaly event signal, at least one root cause of the anomaly, by performing any one or more of the: checking for which of the sensors in the sensor object the sensor's measured output changed from the sensor's expected output at or around the same time as the occurrence of the anomaly event; analyzing the time series residual signal of each sensor within the sensor object to determine one or more main drivers or most dominant contributors to the level signal value; analyzing the time series residual signal of each sensor within the sensor object to determine one or more main drivers or most dominant contributors to the association signal value; and analyzing covariance of time series residual signals of each pair combination of the sensor residual signals within the sensor object to determine one or more main drivers or most dominant contributors to the association signal value.

Clause 5.

The method according to any of the above clauses, wherein the method also comprises:
  determining, in response to the anomaly event signal, state of health of at least one equipment related to the sensor object.

Clause 6.

The method according to any of the above clauses, wherein any of the expected value or the expected limit value is provided by a sensor object model that is a predictive model which has been trained using historical residual data of the sensor object.

Clause 7.

The method according to clause 6, wherein one or more covariate signals are provided as input to the sensor object model, each covariate signal being a signal representing a parameter upon which at least one of the residual signals are dependent upon.

Clause 8.

The method according to any of the above clauses, wherein at least one sensor expected output is provided by an expected state model that is at least partially a predictive model trained using historical time-series output data of the respective sensor.

Clause 9.

The method according to clause 8, wherein one or more covariate signals are provided as input to the expected state model, each covariate signal being a signal representing a parameter upon which the sensor's output is dependent upon.

Clause 10.

The method according to any of the above clauses, wherein the sensor object is provided by at least partially automatically grouping the at least some of the sensors, for example, using at least one data-centric algorithm, such as a clustering algorithm, for example a self-organizing map algorithm, further for example, the sensor object being at least partially automatically generated by any of the one or more processing units using at least one self-organizing map.

Clause 11.

The method according to any of the clauses 8-10, wherein the expected state model is selected automatically by the processing unit by analyzing a plurality of different predictive model types, and selecting the model type as the expected state model which provides the lowest error between: the output of that model when trained with a specific training window of the historical time-series data; and the actual historical sensor output within a specific time-window of the historical time-series data.

Clause 12.

The method according to any of the above clauses, wherein the level signal value is generated using a distance estimator indicating the time at which and the amount by which the time-series residual data deviates from its normal or expected or mean state.

Clause 13.

The method according to any of the above clauses, wherein the association signal value is generated using a statistical measure of multivariate dependencies in the residual data, or to measure at a given time the dispersion of the time-series residual data.

Clause 14.

The method according to any of the above clauses, wherein method also comprises:
  detecting, via any of the one or more processing units, a drift in the output signal a sensor; wherein the sensor is among the at least some of the sensors, and wherein the drift is computed from historical time series data of the sensor, the historical data of the sensor being from a time period that is at least 1 week long, and wherein the drift is detected by computing the strength, smoothness and currentness of the historical data of the sensor.

Clause 15.

A method for monitoring a plant comprising a plurality of sensors, and one or more functionally connected processing units, the method comprising:
  providing, at any of the one or more processing units, time-series residual data of a sensor object; the sensor object being a group of at least some of the sensors from the plurality of sensors, and wherein the residual data comprises, for each of the sensors of the sensor object, a residual signal which is a difference between the sensor's measured output and the sensor's expected output,
  monitoring, via any of the one or more processing units, a level signal; wherein the level signal is indicative of a collective time-based variation of the time-series residual data,
  generating, via any of the one or more processing units, a level event signal; wherein the level event signal is generated when at a given time a value of the level signal changes from an expected value of the level signal at or around that time, wherein the level event signal is indicative of an anomaly in at least one of the equipment in the plant.

Clause 16.

A method for monitoring a plant comprising a plurality of sensors, and one or more functionally connected processing units, the method comprising:
  providing, at any of the one or more processing units, time-series residual data of a sensor object; the sensor object being a group of at least some of the sensors from the plurality of sensors, and wherein the residual data comprises, for each of the sensors of the sensor object, a residual signal which is a difference between the sensor's measured output and the sensor's expected output,
  monitoring, via any of the one or more processing units, an association signal; wherein the association signal is indicative of the variation and/or association structure of the time-series residual data,
  generating, via any of the one or more processing units, an association event signal; wherein the association event signal is generated when at a given time a value of the level signal changes from an expected value of the association signal at or around that time, wherein the association event signal is indicative of an anomaly in at least one of the equipment in the plant.

Clause 17.

A method for monitoring a plant comprising a plurality of sensors, and one or more functionally connected processing units, the method comprising:
  providing, at any of the one or more processing units, time-series residual data of a sensor object; the sensor object being a group of at least some of the sensors from the plurality of sensors, and wherein the residual data comprises, for each of the sensors of the sensor object, a residue signal which is a difference between the sensor's measured output and the sensor's expected output, wherein the sensor object is provided by at least partially automatically grouping the at least some of the sensors, monitoring, via any of the one or more processing units, a level signal; wherein the level signal is indicative of a collective time-based variation of the time-series residual data, monitoring, via any of the one or more processing units, an association signal; wherein the association signal is indicative of the variation and/or association structure of the time-series residual data, generating, via any of the one or more processing units, an anomaly event signal when at a given time a value of the level signal and/or a value of the association signal changes from an expected value of the respective signal at or around that time.

Clause 18.

A monitoring and/or control system for a plant comprising a plurality of sensors, wherein the system comprises one or more processing units configured to perform the method steps of any of the clauses 1-17.

Clause 19.

A computer program comprising instructions which, when executed by a processing unit of a plant monitoring and/or control system functionally connected to a plurality of sensors, cause the system to carry out the method steps of any of the clauses 1-17.

The invention claimed is:

1. A method for monitoring a plant comprising a plurality of sensors, and one or more functionally connected processing units, comprising:

providing, at any of the one or more processing units, time-series residual data of a sensor object; the sensor object being a group of at least some of the sensors from the plurality of sensors, and wherein the residual data comprises, for each of the sensors of the sensor object, a residue signal which is a difference between the sensor's measured output and the sensor's expected output, monitoring, via any of the one or more processing units, a level signal; wherein the level signal is indicative of a collective time-based variation of the time-series residual data, monitoring, via any of the one or more processing units, an association signal; wherein the association signal is indicative of the variation and/or association structure of the time-series residual data, generating, via any of the one or more processing units, an anomaly event signal when at a given time a value of the level signal and/or a value of the association signal changes from an expected value of the respective signal at that given time, and detecting, via any of the one or more processing units, a drift in the output signal a sensor; wherein the sensor is among the at least some of the sensors, and wherein the drift is computed from historical time series data of the sensor, the historical data of the sensor being from a time period that is at least 1 week long, and wherein the drift is detected by computing the strength, smoothness and currentness of the historical data of the sensor.

2. The method according to claim 1, wherein the any of the respective expected value is provided as a corresponding expected value limit specifying for a given time a plurality of expected values, as a range or as discrete values, that the corresponding signal may validly have without the anomaly event being generated.

3. The method according to claim 2, wherein any of the expected value or the expected limit value is provided by a sensor object model that is at least partially a predictive model trained using historical residual data of the sensor object.

4. The method according to claim 3, wherein one or more covariate signals are provided as input to the sensor object model, each covariate signal being a signal representing a parameter upon which at least one of the residual signals are dependent upon.

5. The method according to claim 1, wherein at least one sensor expected output is provided by an expected state model that is a predictive model trained using historical time-series output data of the respective sensor.

6. The method according to claim 5, wherein the expected state model is selected automatically by the processing unit by analyzing a plurality of different predictive model, and selecting the model as the expected state model which provides the lowest error between: the output of that model when trained with a specific training window of the historical time-series data; and the actual historical sensor output within a specific time-window of the historical time-series data.

7. The method according to claim 1, wherein the method further comprises:

determining, in response to the anomaly event signal, at least one root cause of the anomaly, by performing any one or more of the: checking for which of the sensors in the sensor object the sensor's measured output changed from the sensor's expected output at the same given time as the occurrence of the anomaly event; analyzing the time series residual signal of each sensor within the sensor object to determine one or more main drivers or most dominant contributors to the level signal value; analyzing the time series residual signal of each sensor within the sensor object to determine one or more main drivers or most dominant contributors to the association signal value; and analyzing covariance of time series residual signals of each pair combination of the sensor residual signals within the sensor object to determine one or more main drivers or most dominant contributors to the association signal value.

8. The method according to claim 1, wherein the method further comprises:

determining, in response to the anomaly event signal, state of health of at least one equipment related to the sensor object.

9. The method according to claim 1, wherein the sensor object is provided by at least partially automatically grouping the at least some of the sensors using at least one data-centric algorithm.

10. The method according to claim 1, wherein the sensor object is at least partially automatically generated by any of the one or more processing units using at least one self-organizing map.

11. The method according to claim 1, wherein the level signal value is generated using a distance estimator indicating the time at which and the amount by which the time-series residual data deviates from its normal or expected or mean state.

12. The method according to claim 1, wherein the association signal value is generated using a statistical measure of multivariate dependencies in the residual data, or to measure at a given time the dispersion of the time-series residual data.

13. A monitoring and/or control system for a plant comprising a plurality of sensors, wherein the system comprises one or more processing units configured to perform the method steps of claim 1.

14. A non-transitory computer program comprising instructions which, when executed by a processing unit of a plant monitoring and/or control system functionally connected to a plurality of sensors, cause the system to carry out the method steps of claim 1.

* * * * *